(12) United States Patent
Takayama et al.

(10) Patent No.: US 9,881,073 B2
(45) Date of Patent: Jan. 30, 2018

(54) METHOD FOR RECONFIGURATION OF DATABASE, RECORDING MEDIUM, AND RECONFIGURATION DEVICE

(71) Applicant: FUJITSU LIMITED, Kawasaki-shi, Kanagawa (JP)

(72) Inventors: Kuniharu Takayama, Tama (JP); Satoshi Munakata, Kawasaki (JP); Naoto Takahashi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 477 days.

(21) Appl. No.: 14/612,749

(22) Filed: Feb. 3, 2015

(65) Prior Publication Data
US 2015/0248440 A1    Sep. 3, 2015

(30) Foreign Application Priority Data

Mar. 3, 2014    (JP) .................................. 2014-040291

(51) Int. Cl.
G06F 17/30    (2006.01)
G06F 17/27    (2006.01)

(52) U.S. Cl.
CPC ...... *G06F 17/30598* (2013.01); *G06F 17/278* (2013.01); *G06F 17/30312* (2013.01); *G06F 17/30336* (2013.01); *G06F 17/30604* (2013.01)

(58) Field of Classification Search
CPC ............. G06F 17/30598; G06F 17/278; G06F 17/30312; G06F 17/30336; G06F 17/30604; G06F 17/2785; G06F 17/30424; G06F 17/30705; G06F 17/30914; H04N 21/4668

USPC ........................................................ 707/737
See application file for complete search history.

(56) References Cited

U.S. PATENT DOCUMENTS

| 5,778,375 A | 7/1998 | Hecht |
| 6,678,693 B1 | 1/2004 | Shiraishi |
| 2006/0122978 A1 | 6/2006 | Brill et al. |
| 2010/0161566 A1* | 6/2010 | Adair ................ G06F 17/30536 707/690 |
| 2011/0238654 A1* | 9/2011 | Allen ................ G06F 17/30539 707/718 |

(Continued)

FOREIGN PATENT DOCUMENTS

| JP | 09-292981 A | 11/1997 |
| JP | 2001-306373 A | 11/2001 |
| JP | 2006-164246 A | 6/2006 |

*Primary Examiner* — Evan Aspinwall
(74) *Attorney, Agent, or Firm* — Fujitsu Patent Center

(57) ABSTRACT

A method for reconfiguration of a database, the method includes extracting a plurality of entity candidates based on a plurality of attribute names and first information about a relation degree between the attribute name and the entity, first identifying a plurality of entity candidate groups in which each is comprised of extracted the plurality of entity candidates and has a correspondence relation with all the attribute names and the number of the entity candidates is minimum, second identifying the entity candidate group, in which a total of relation degrees between the entities in the entity candidate group is maximum, based on second information about the relation degree between the entities, and assigning each of the plurality of attribute names to either one of the plurality of entity candidates so as to have the correspondence relation of the attribute name and the entity candidate based on the first information.

15 Claims, 25 Drawing Sheets

(56) References Cited

U.S. PATENT DOCUMENTS

2013/0054598 A1* 2/2013 Caceres ............ G06F 17/30303
　　　　　　　　　　　　　　　　　　　　707/737

* cited by examiner

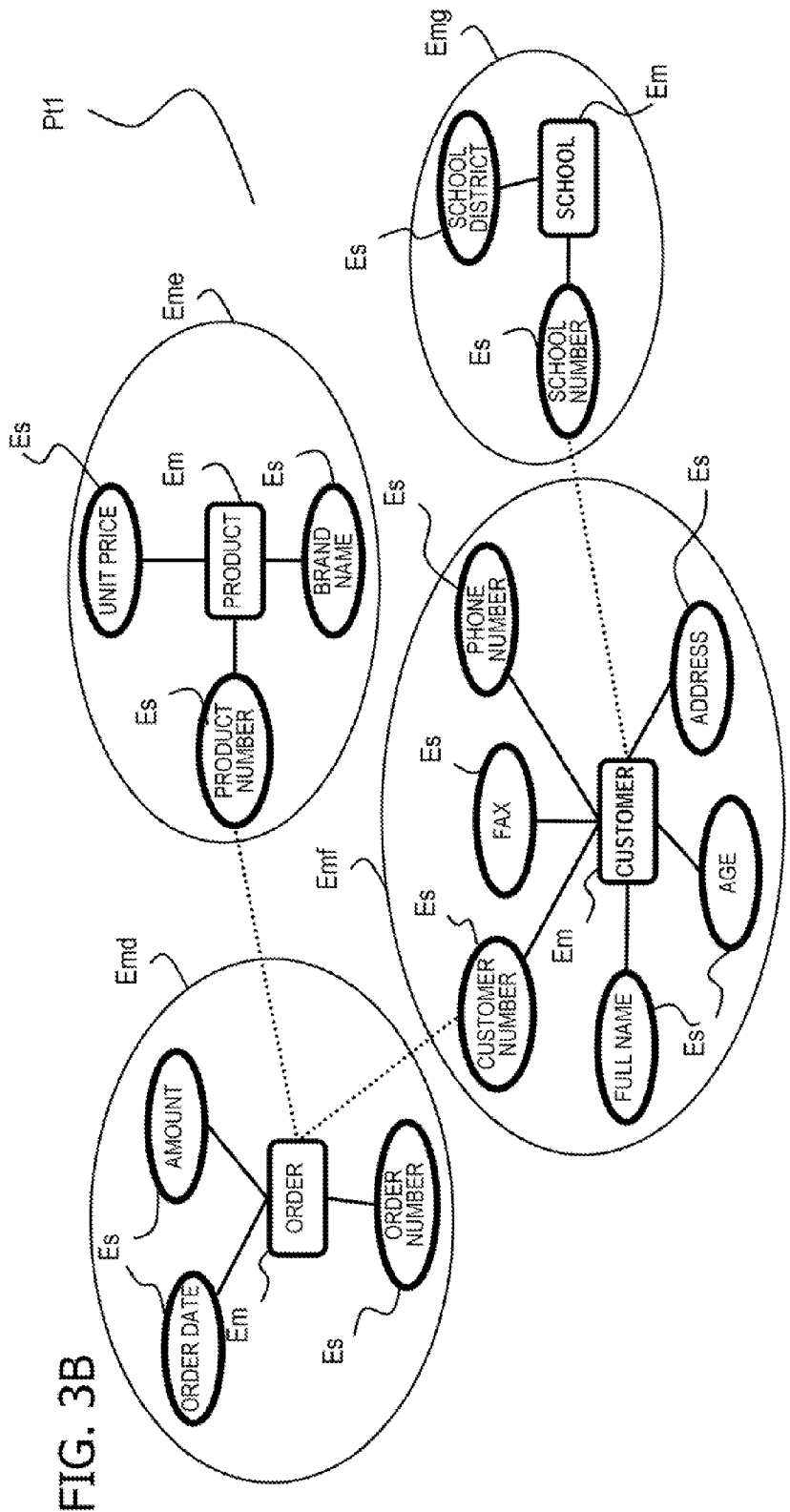

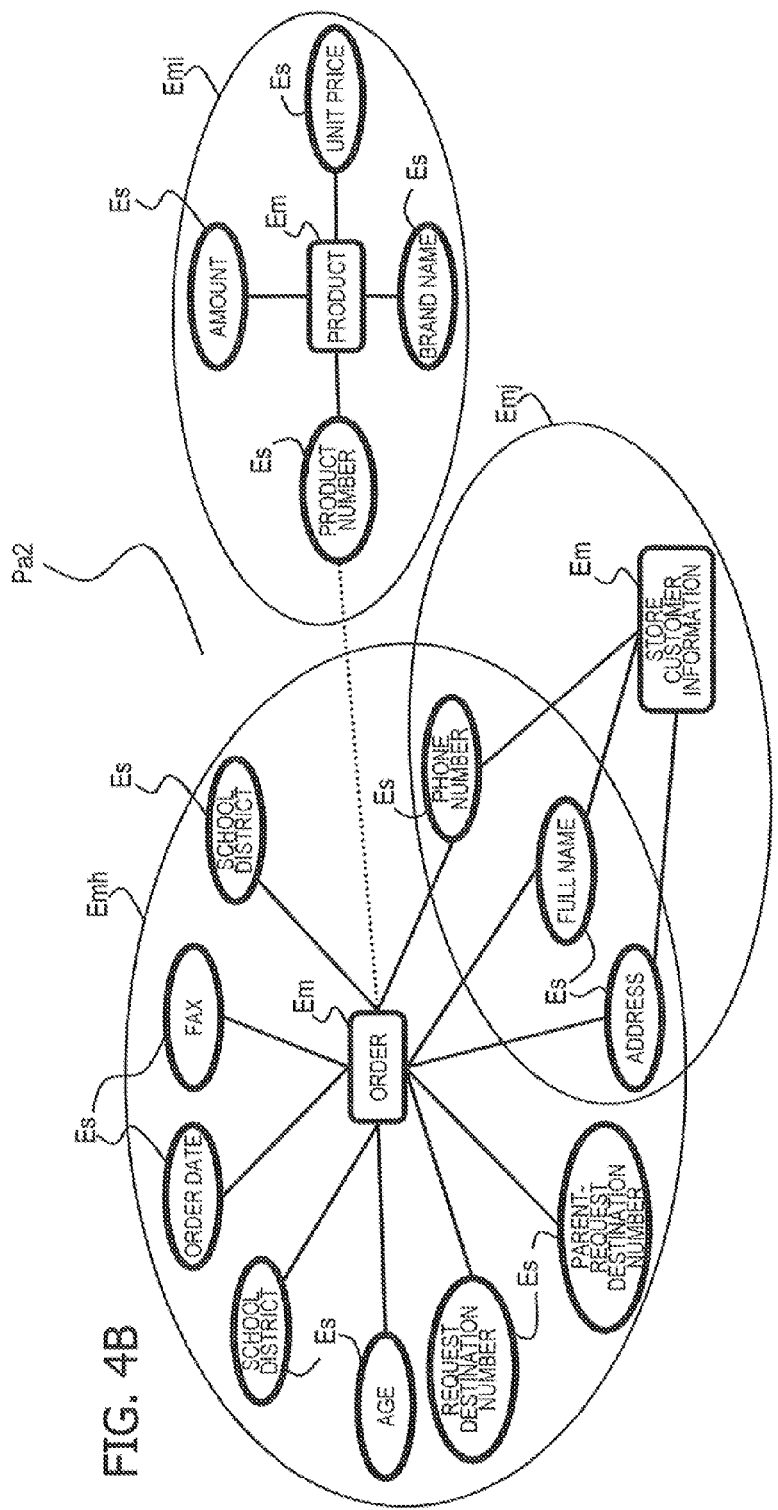

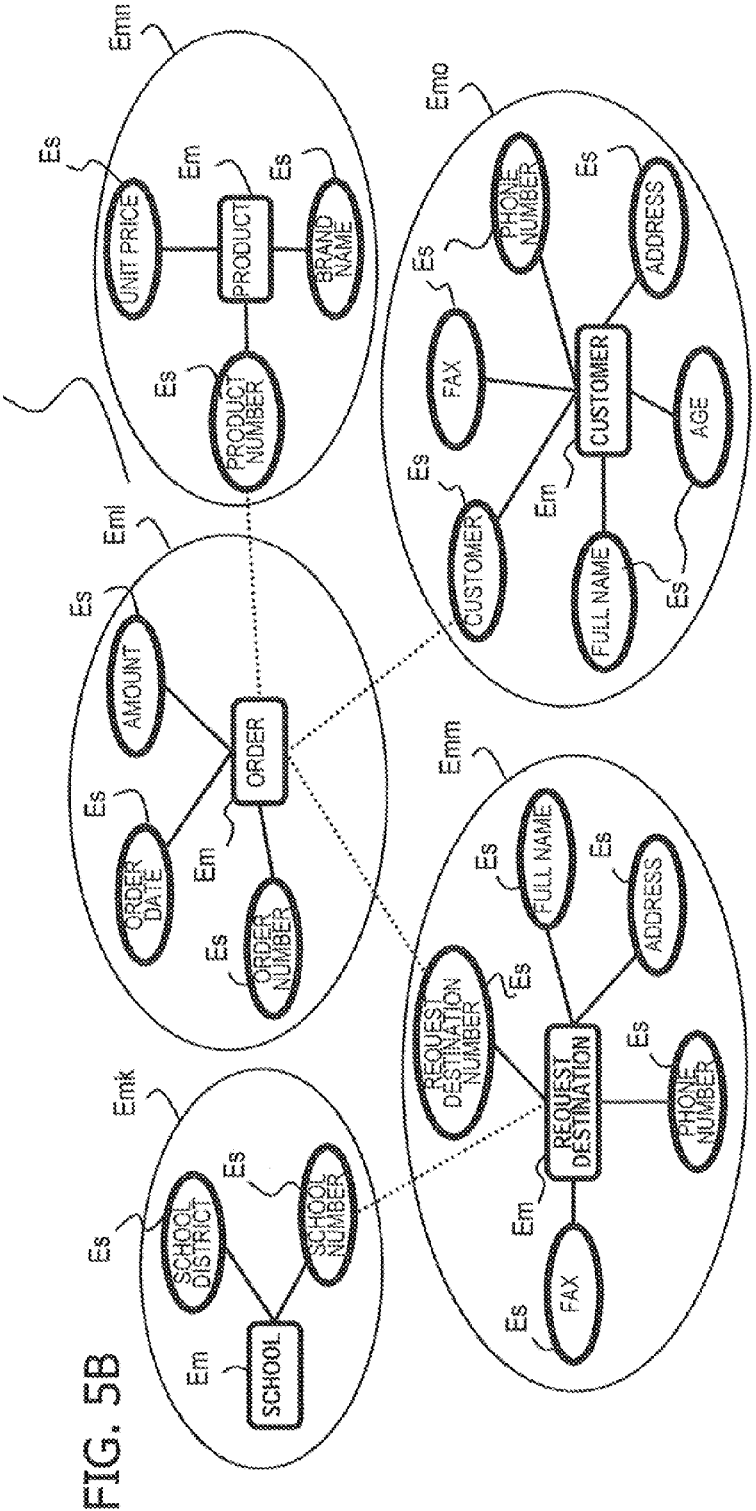

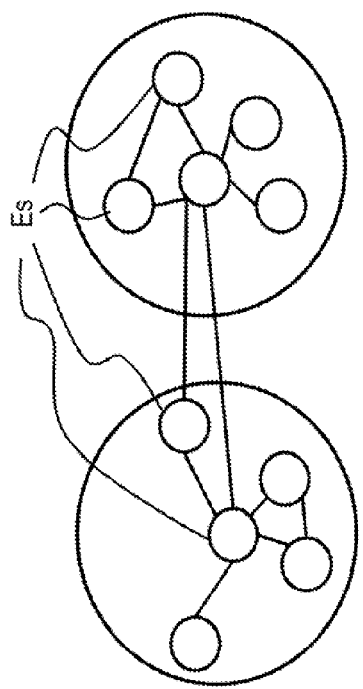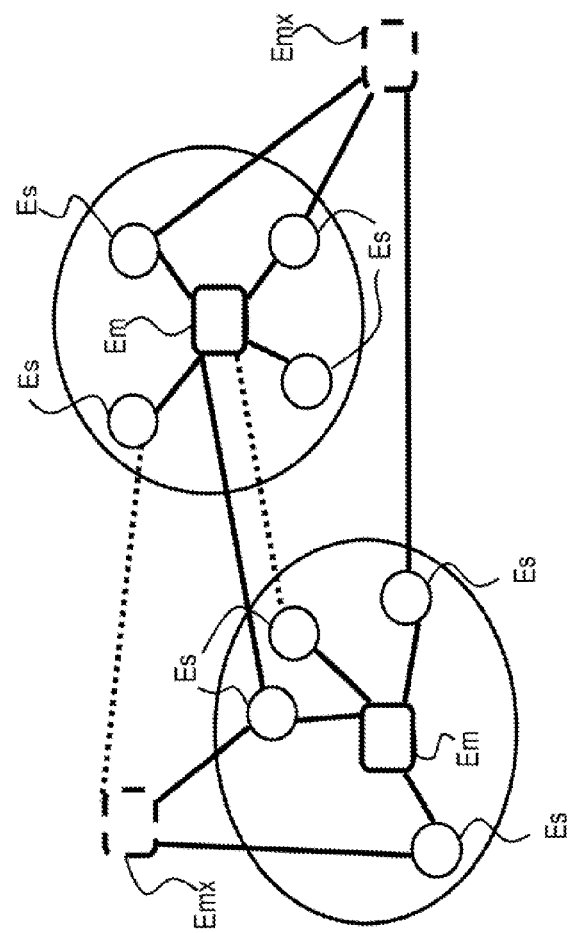

FIG. 10

| T1 | ENTITY - ATTRIBUTE NAME RELATION LIST | | | |
|---|---|---|---|---|
| | | | ENTITY | |
| | | a | b | c |
| | | ORDER | PRODUCT | STORE CUSTOMER INFORMATION |
| ATTRIBUTE NAME | 1 ORDER DATE | ○ | | |
| | 2 FULL NAME | ○ | | ○ |
| | 3 AGE | ○ | | |
| | 4 ADDRESS | ○ | | ○ |
| | 5 SCHOOL DISTRICT | ○ | | |
| | 6 PHONE NUMBER | ○ | | ○ |
| | 7 FAX | ○ | | |
| | 8 PRODUCT NUMBER | ○ | ○ | |
| | 9 AMOUNT | ○ | | |
| | 10 BRAND NAME | | ○ | |
| | 11 UNIT PRICE | | ○ | |

FIG. 11

ENTITY - ATTRIBUTE NAME RELATION LIST (T2)

| | ATTRIBUTE NAME | ENTITY |
|---|---|---|
| 1 | ORDER DATE | |
| 2 | FULL NAME | |
| 3 | AGE | |
| 4 | ADDRESS | |
| 5 | SCHOOL DISTRICT | |
| 6 | PHONE NUMBER | |
| 7 | FAX | |
| 8 | PRODUCT NUMBER | |
| 9 | AMOUNT | |
| 10 | BRAND NAME | |
| 11 | UNIT PRICE | |

FIG. 13

| ATTRIBUTE NAME - ENTITY CANDIDATE RELATION DEGREE LIST | | |
|---|---|---|
| ATTRIBUTE NAME | ENTITY CANDIDATE | USE FREQUENCY |
| ... | | |
| ORDER DATE | ORDER | 7,710 |
| ORDER DATE | PRODUCT | 770 |
| ... | | |
| AMOUNT | ORDER | 401,000 |
| AMOUNT | PRODUCT | 42,300 |
| ... | | |
| PRODUCT NUMBER | ORDER | 47,500 |
| PRODUCT NUMBER | PRODUCT | 98,300 |
| ... | | |
| FULL NAME | CUSTOMER | 3,910 |
| FULL NAME | BUYER | 702 |
| ... | | |
| AGE | CUSTOMER | 8,920 |
| AGE | BUYER | 4,060 |
| ... | | |
| ADDRESS | CUSTOMER | 45,000 |
| ADDRESS | BUYER | 2,250 |
| ADDRESS | SCHOOL | 6,760 |
| ... | | |
| PHONE NUMBER | CUSTOMER | 21,000 |
| PHONE NUMBER | BUYER | 1,350 |
| PHONE NUMBER | SCHOOL | 4,770 |
| ... | | |
| FAX | CUSTOMER | 7,950 |
| FAX | BUYER | 10,800 |
| FAX | SCHOOL | 4,180 |
| ... | | |
| SCHOOL DISTRICT | SCHOOL | 2,360 |
| ... | | |

| | | ENTITY - ATTRIBUTE NAME RELATION LIST | | | | | |
|---|---|---|---|---|---|---|---|
| | | ENTITY CANDIDATE | | | | | |
| | | a | b | c | d | e | ... |
| | | ORDER | PRODUCT | CUSTOMER | BUYER | SCHOOL | ... |
| ATTRIBUTE NAME | 1 ORDER DATE | ○ | | | | | |
| | 2 FULL NAME | | | ○ | ○ | | |
| | 3 AGE | | | ○ | ○ | | |
| | 4 ADDRESS | | | | ○ | ○ | |
| | 5 SCHOOL DISTRICT | | | | ○ | ○ | |
| | 6 PHONE NUMBER | | | ○ | | | |
| | 7 FAX | | | | | | |
| | 8 PRODUCT NUMBER | ○ | ○ | | | | |
| | 9 AMOUNT | ○ | ○ | | | | |
| | 10 BRAND NAME | | ○ | | | | |
| | 11 UNIT PRICE | | | | | | |

ENTITY - ATTRIBUTE NAME RELATION LIST

| | Attribute Name | ENTITY CANDIDATE | | | |
|---|---|---|---|---|---|
| | | a ORDER | b PRODUCT | c CUSTOMER | e SCHOOL |
| 1 | ORDER DATE | ○ | | | |
| 2 | FULL NAME | | | ○ | |
| 3 | AGE | | | ○ | |
| 4 | ADDRESS | | | ○ | ○ |
| 5 | SCHOOL DISTRICT | | | | ○ |
| 6 | PHONE NUMBER | | | ○ | ○ |
| 7 | FAX | ○ | | | ○ |
| 8 | PRODUCT NUMBER | ○ | ○ | | |
| 9 | AMOUNT | | ○ | | |
| 10 | BRAND NAME | | ○ | | |
| 11 | UNIT PRICE | | ○ | | |

| | | ENTITY - ATTRIBUTE NAME RELATION LIST | | | | |
|---|---|---|---|---|---|---|
| | | | ENTITY CANDIDATE | | | |
| | | | a | b | d | e |
| | | | ORDER | PRODUCT | BUYER | SCHOOL |
| ATTRIBUTE NAME | 1 | ORDER DATE | ○ | | | |
| | 2 | FULL NAME | | | ○ | |
| | 3 | AGE | | | ○ | |
| | 4 | ADDRESS | | | ○ | |
| | 5 | SCHOOL DISTRICT | | | | ○ |
| | 6 | PHONE NUMBER | | | ○ | ○ |
| | 7 | FAX | | | | ○ |
| | 8 | PRODUCT NUMBER | ○ | ○ | | |
| | 9 | AMOUNT | ○ | ○ | | |
| | 10 | BRAND NAME | | ○ | | |
| | 11 | UNIT PRICE | | | | |

FIG. 17

| RELATION DEGREE LIST BETWEEN THE ENTITY CANDIDATES ||||| 
|---|---|---|---|---|
| ENTITY CANDIDATE | ENTITY CANDIDATE | USE FREQUENCY | GROUP(A) | GROUP(B) |
| ... | | | | |
| ORDER | PRODUCT | 26,700 | ○ | ○ |
| ORDER | CUSTOMER | 8,340 | ○ | |
| ORDER | BUYER | 8,140 | | ○ |
| ORDER | SCHOOL | 17,700 | ○ | ○ |
| ... | | | | |
| PRODUCT | ORDER | 27,400 | ○ | ○ |
| PRODUCT | CUSTOMER | 12,500 | ○ | |
| PRODUCT | BUYER | 6,400 | | ○ |
| PRODUCT | SCHOOL | 31,500 | ○ | ○ |
| ... | | | | |
| CUSTOMER | ORDER | 8,100 | ○ | |
| CUSTOMER | PRODUCT | 12,200 | ○ | |
| CUSTOMER | BUYER | 1,480 | ○ | |
| CUSTOMER | SCHOOL | 9,930 | ○ | |
| ... | | | | |
| BUYER | ORDER | 7,500 | | ○ |
| BUYER | PRODUCT | 6,650 | | ○ |
| BUYER | BUYER | 1,560 | | ○ |
| BUYER | SCHOOL | 3,800 | | ○ |
| ... | | | | |
| SCHOOL | ORDER | 18,700 | ○ | ○ |
| SCHOOL | PRODUCT | 30,600 | ○ | ○ |
| SCHOOL | CUSTOMER | 10,000 | ○ | |
| SCHOOL | BUYER | 4,100 | | ○ |
| ... | | | | |

ENTITY - ATTRIBUTE NAME RELATION LIST

| | | ENTITY CANDIDATE | | | |
|---|---|---|---|---|---|
| | | a | b | c | e |
| | | ORDER | PRODUCT | CUSTOMER | SCHOOL |
| ATTRIBUTE NAME | 1 ORDER DATE | ○ | | | |
| | 2 FULL NAME | | | ○ | |
| | 3 AGE | | | ○ | |
| | 4 ADDRESS | | | ○ | |
| | 5 SCHOOL DISTRICT | | | | ○ |
| | 6 PHONE NUMBER | ○ | | ○ | ○ |
| | 7 FAX | ○ | | | ○ |
| | 8 PRODUCT NUMBER | | ○ | | |
| | 9 AMOUNT | | ○ | | ○ |
| | 10 BRAND NAME | | ○ | | |
| | 11 UNIT PRICE | | ○ | | |

FIG. 18B

| T5 | ENTITY - ATTRIBUTE NAME RELATION LIST | | | | | |
|---|---|---|---|---|---|---|
| | | | ENTITY CANDIDATE | | | |
| | | | a<br>ORDER | b<br>PRODUCT | c<br>CUSTOMER | e<br>SCHOOL |
| ATTRIBUTE NAME | 1 | ORDER DATE | ○ | | | |
| | 2 | FULL NAME | | | ○ | |
| | 3 | AGE | | | ○ | ○ |
| | 4 | ADDRESS | | | | |
| | 5 | SCHOOL DISTRICT | | | ○ | ○ |
| | 6 | PHONE NUMBER | | | | |
| | 7 | FAX | ○ | | | |
| | 8 | PRODUCT NUMBER | | ○ | | |
| | 9 | AMOUNT | | ○ | | |
| | 10 | BRAND NAME | | | | |
| | 11 | UNIT PRICE | | | | |

FIG. 20

| | ToBe SCHEMA | | | | | | | | |
|---|---|---|---|---|---|---|---|---|---|
| ENTITY | ORDER | | PRODUCT | | CUSTOMER | | | | SCHOOL |
| ATTRIBUTE NAME | ORDER NUMBER | ORDER DATE | PRODUCT NUMBER | BRAND NAME | UNIT PRICE | FULL NAME | AGE | ADDRESS | PHONE NUMBER | FAX | SCHOOL NUMBER |

Stx

FIG. 21

| | ToBe SCHEMA | | | | | | | | | | | | |
|---|---|---|---|---|---|---|---|---|---|---|---|---|---|
| ENTITY | ORDER | | | PRODUCT | | | CUSTOMER | | | | | | SCHOOL |
| ATTRIBUTE NAME | [ORDER NUMBER] | ORDER DATE | [PRODUCT NUMBER] AMOUNT | [PRODUCT NUMBER] | BRAND NAME | UNIT PRICE | [CUSTOMER NUMBER] | FULL NAME | AGE | ADDRESS | PHONE NUMBER | FAX | [SCHOOL NUMBER] | [SCHOOL NUMBER] | SCHOOL DISTRICT |

| ENTITY - ATTRIBUTE NAME RELATION LIST | | | | |
|---|---|---|---|---|
| | | ENTITY | | |
| | | a<br>ORDER | b<br>PRODUCT | c<br>CUSTOMER |
| ATTRIBUTE NAME | 1 | ORDER NUMBER | ORDER NUMBER | ORDER NUMBER |
| | 2 | PRODUCT NUMBER | PRODUCT NUMBER | |
| | 3 | CUSTOMER NUMBER | | CUSTOMER NUMBER |
| | ... | ... | ... | ... |

| ENTITY - ATTRIBUTE NAME RELATION LIST | | |
|---|---|---|
| | | ENTITY |
| ATTRIBUTE NAME | 1 | ORDER NUMBER |
| | 2 | PRODUCT NUMBER |
| | 3 | CUSTOMER NUMBER |
| | ... | ... |

T12

METHOD FOR RECONFIGURATION OF DATABASE, RECORDING MEDIUM, AND RECONFIGURATION DEVICE

CROSS-REFERENCE TO RELATED APPLICATION

This application is based upon and claims the benefit of priority of the prior Japanese Patent Application No. 2014-040291, filed on Mar. 3, 2014, the entire contents of which are incorporated herein by reference.

FIELD

The embodiments discussed herein are related to a method for reconfiguration of a database, a computer-readable non-transitory recording medium, and a reconfiguration device of the database.

BACKGROUND

For business system such as the large-scale enterprise system (for example, customer relationship management system), a maintenance and a repair are repeatedly performed to follow a change of the business. Since the maintenance and the repair are carried out repeatedly, the business system is enlarged and becomes complicated. Therefore, reconfiguration of the business system may be needed.

The business system include an entity and an event. The entity indicates, for example, a noun-like element such as a customer and a product and become a target of create, update, reference, and deletion processing. In addition, the entity is stored in a database (below called as DB appropriately) as data which the business system processes. Furthermore, the entity, for example, has an entity name like the customer and an attribute such as information of "full name" of the customer and "unit price" of the product. The attribute has an attribute name such as "the full name" and an attribute value like "Fuji Michiko".

The entity and the attribute, which the data base has, are prescribed by definition information called schema. The schema includes relation of the entity and the attribute, an entity name and an attribute name, but does not include the attribute value. On the other hand, the event indicates a verb-like element such as registration and ordering, and behavior to let the state of the entity change.

One of the big work of the reconfiguration of the business system makes the entity group (data system), that a semi-orthogonal state is brought by the maintenance and the repair, to be semi-orthogonal and reconstructs the data base (for example, patent document 1). The semi-orthogonal means to select the combination of entities which not have a same attribute name each other and have an independent concept. In addition, when the one or more attributes name, of which an entity has, has a specific attribute value, the attribute name having the attribute value is called as instance of the entity.

In contrast, when different entities have a same attribute name, a plurality of data having the same meaning will exist between the plurality of instances which indicate the specific example of each of plurality of entities. When the plurality of data having the same meaning exist between the entities corresponding to the entity, data having a specific attribute name exist in the plurality of instances and the uniqueness of the data in the whole system is spoiled. In the system, because it is needed to update each attribute corresponding to the data for the update target when updating the data, it is caused a program processing of the update to become large and complexity. In addition, when the attribute name that an entity has a plurality of concepts, not an independent concept, the data update processing makes complicatedness and a program of updating the data becomes large and complexity.

CITED REFERENCE

Patent Document (patent document 1) Japanese Laid-open Patent Publication No. 2006-164246

SUMMARY

However, because manual labor is needed to make the semi-orthogonal of the entity group, enormous man-hour is needed for making the semi-orthogonal of the large-scale enterprise system having enormous entities group. In addition, although the use of true data (attribute value) is useful in the semi-orthogonal, the true data may not often are used from the viewpoint of personal information protection and security. In addition, because the semi-orthogonal is based on the relation with the entity and the attribute name, it is difficult to perform it appropriately only with the connection between the attribute names by the duster analysis.

According to a first aspect of the embodiment, a method for reconfiguration of a database, the method includes, extracting a plurality of entity candidates based on a plurality of attribute names which are included in any of a plurality of databases and first information about a relation degree between the attribute name and the entity, each of the plurality of databases including an entity having a correspondence relation with the plurality of attribute names, first identifying a plurality of entity candidate groups in which each is comprised of extracted the plurality of entity candidates and has a correspondence relation with all the attribute names and the number of the entity candidates is minimum, second identifying the entity candidate group, in which a total of relation degrees between the entities in the entity candidate group is maximum, among the plurality of entity candidate groups which are identified, based on second information about the relation degree between the entities, and assigning each of the plurality of attribute names to either one of the plurality of entity candidates in the entity candidate group so as to have the correspondence relation of the attribute name and the entity candidate based on the first information.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3A and FIG. 3B are diagrams illustrating an example of ToBe schema SU corresponding to the AsIs schema in FIG. 2A and FIG. 2B and the semi-orthogonal state of the schema.

FIG. 4A and FIG. 4B are diagrams illustrating another example of the AsIs schema Sa and the semi-orthogonal state of the schema.

FIG. 5A and FIG. 5B are diagrams illustrating an example of the ToBe schema St2 corresponding to the AsIs schema in FIG. 4A and FIG. 4B and the semi-orthogonal state of the schema.

FIG. 6A and FIG. 6B are diagrams explaining the semi-orthogonal process of data system.

FIG. 10 is a diagram indicating an example of the entity-attribute name relation list T1 which is generated by the step S11 in FIG. 9.

FIG. 11 is a diagram indicating an example of the list of attribute names generated by the step S12 in FIG. 9.

FIG. 13 is a diagram indicating an example of the attribute name-entity candidate relation degree list H1 according to the present embodiment.

FIG. 14 is a diagram indicating an example of the entity-attribute name relation list T3 which is updated by the step S13 in FIG. 9.

FIG. 15A and FIG. 15B are the entity-attribute name relation lists indicating an example of two entity candidates group extracted by the step S14 in FIG. 9.

FIG. 17 is a diagram indicating an example of relation degree list H2 between the entity candidates according to the present embodiment.

FIG. 18A and FIG. 18B are diagrams explaining selection process (step S16 in FIG. 9) of the correspondence relation between the attribute name and the entity candidate.

FIG. 20 is a diagram explaining data system of the ToBe schema Stx which is output by the step S17 in FIG. 9.

FIG. 21 is a diagram indicating an example of the data system of the ToBe schema SU where the reference relations between the entities are supplemented by the user.

FIG. 23A and FIG. 23B are diagrams illustrating an example of the entity-attribute name relation lists T11, T12 of the data system of the AsIs schema Sa in which the attribute name circulates through between entities.

DESCRIPTION OF EMBODIMENTS

Figure 1A:
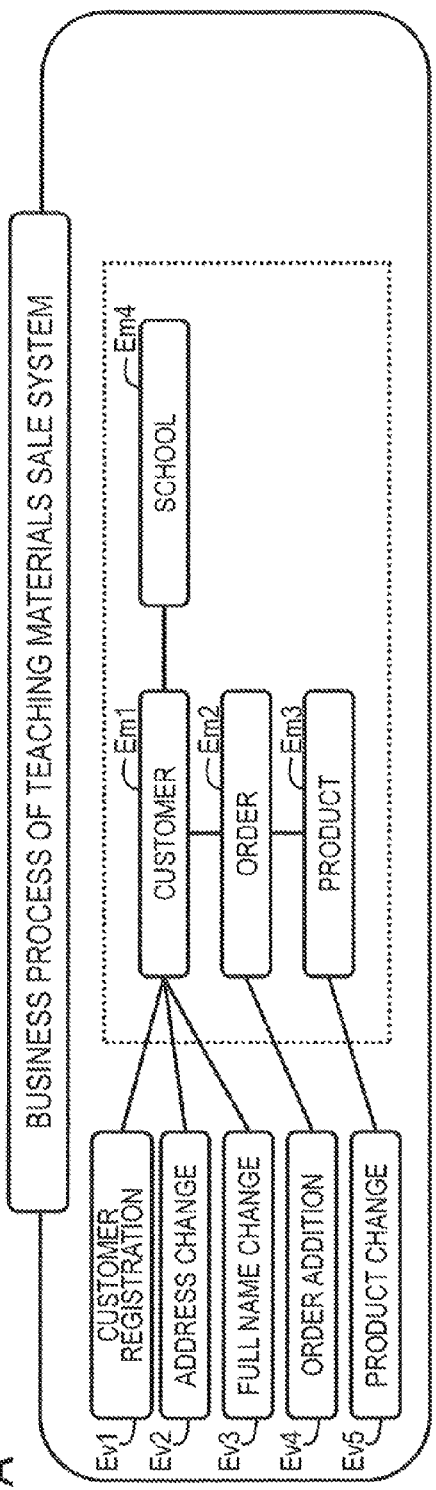
FIG. 1A and FIG. 1B are diagrams indicating an example of the relation with business and system.
Figure 1B:
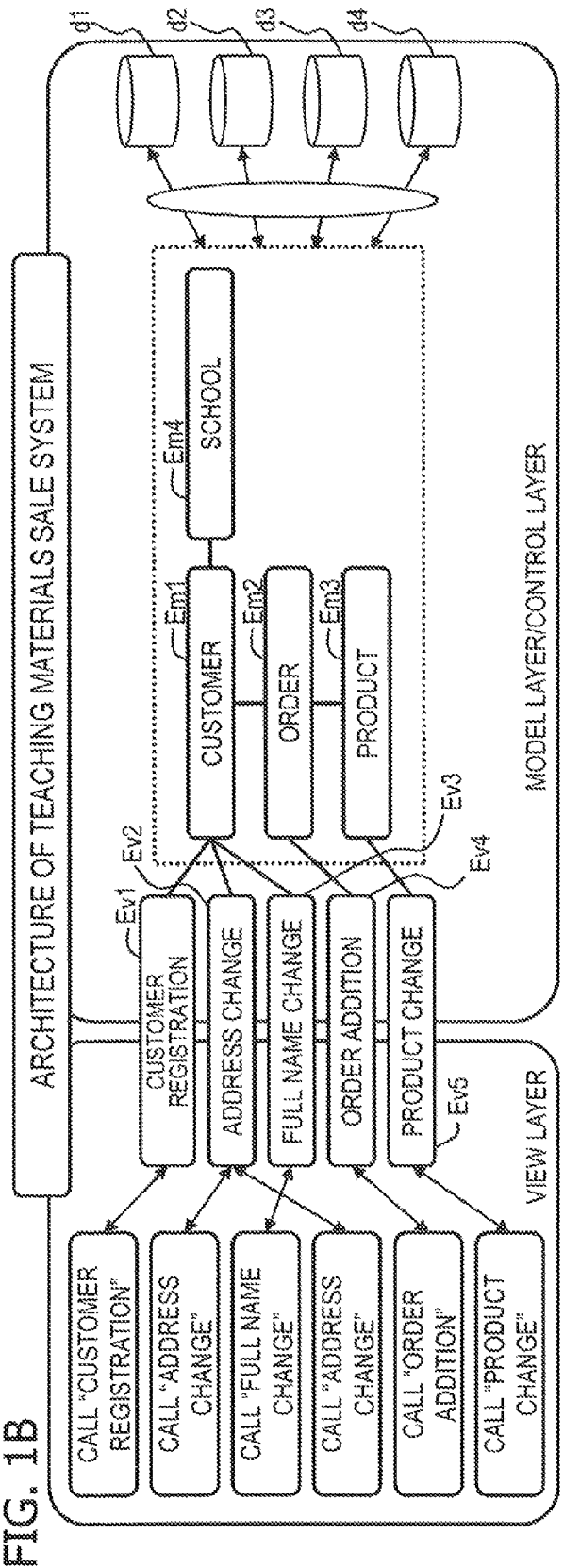

FIG. 1A and FIG. 1B are diagrams indicating an example of the relation with business and system. FIG. 1A illustrates business process of teaching materials sale system, and FIG. 1B illustrates the architecture (system construction) of the teaching materials sale system. The teaching materials sale system is a system managing the sale situation of the teaching materials for a customer belonging to the school district, for example.

The teaching materials sale business depicted by FIG. 1A has entities such as "customer" Em1, "order" Em2, "product" Em3, "school" Em4", and events such as "customer registration" Ev1, "address change" Ev2, "full name change" Ev3, "order addition" Ev4, "product change" Ev5". The entity is the noun-like element which is targeted for creation processing, update processing, reference processing, and deletion processing. In addition, each of the entities has a plurality of attribute names which is not illustrated in FIG. 1A. For example, the entity "customer" Em1 has the attribute names "full name" and "addresses". On the other hand, the event is a verb-like element indicating the behavior to let the state of the entity transition. For example, when an event corresponding to the event "customer registration" Ev1 occurs, new data are created in the instance corresponding to the entity "customer" Em1. Similarly, for example, when the event "product change" Ev5 occurs, data of the entity "product" Em3 are updated.

The architecture of the teaching materials sale system depicted by FIG. 1B has View layer, Model layer and Control layer. The Model layer is an element indicating the data of which the teaching materials sale system handles. The data are equivalent to the entity in FIG. 1A, and, for example, are stored in database (DB) d1-d4. For example, in the example of FIG. 16, the data are stored in each of the databases d1-d4 far every entity. The database d1-d4 are constructed by a storage device, for example. The data are retrieved from the database d1-d4 and are updated on a memory and are stored again in the database d1-d4. The View layer is an element to take out the data on the model layer, and to display in form suitable for reading. In other words, the View layer performs the output to the user interface such as screen. The Control layer is an element to carry out the processing according to an event in response to the event. In other words, the Control layer carries out the processing in response to input from the user interface.

A flow of the processing in the teaching materials sale system depicted by FIG. 1B will be explained. At first, when the instruction is input into the View layer through the user interface such as screen by pushing down button by the user, the Control layer carries out the process of an event (for example, the event "customer registration" Ev1) from the View layer. As a result, data in conjunction with the entity "customer" Em1 in the model layer are updated. And the View layer acquires data in conjunction with updated entity "customer" Em1 from the Model layer and updates the display contents such as screen.

In addition, the entity and the attribute name of which the database has, are prescribed by the definition information called the schema. Below, the schema indicating the present business system is called as AsIs schema and the schema indicating the business system, which is in a state as it should be, is called as ToBe schema. The DB reconfiguration device according to the present embodiment reconstructs the database by the semi-orthogonal processing as input by the AsIs schema and generates the ToBe schema. In addition, the definition information is also stored in the database d1-d4.

(Example of Schema)

Figures 2A, 2B:
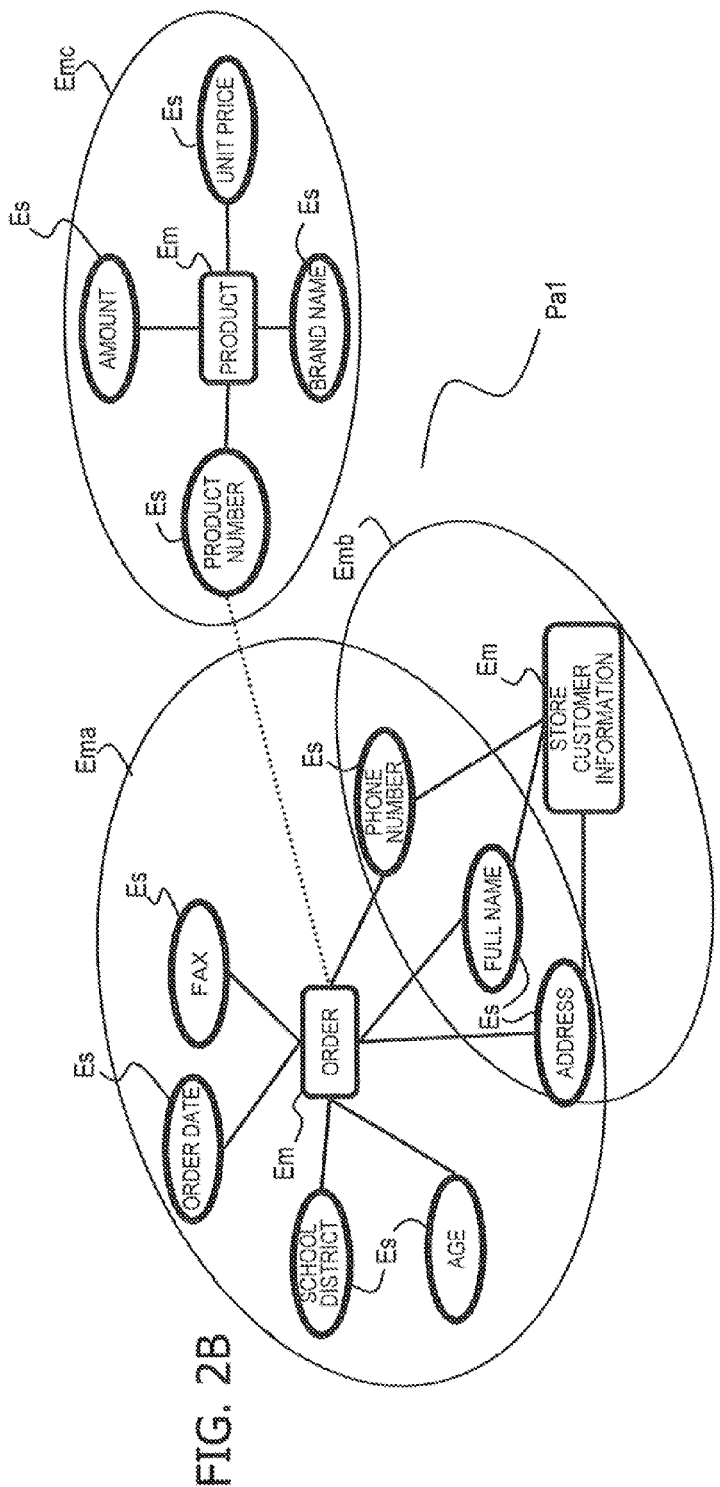
FIG. 2A is a diagram illustrating an example of the AsIs schema Sa1 and FIG. 2B is a diagram illustrating the example of the semi-orthogonal state of the schemas according to the embodiment.

FIG. 2A is a diagram illustrating an example of the AsIs schema Sa1 and FIG. 2B is a diagram illustrating the example of the semi-orthogonal state of the schemas according to the embodiment. The AsIs schema Sa1 according to the present embodiment is a schema targeted for the semi-orthogonal processing and indicating the present business system as described above in FIG. 1A and FIG. 1B. In addition, in FIG. 2A, the attribute name surrounded in a parenthesis in the AsIs schema Sa1 is ID (Identification) number which refers to other entities. Specially, the attribute name "(product number)" in the AsIs schema Sa1 in FIG. 2A is the identification information to be able to refer to the data of the entity "product".

The data system of the AsIs schema Sa1 depicted by FIG. 2A has three concepts such as an order, a product, and a customer, for example. Further, in data system of the AsIs schema Sa1 depicted by FIG. 2A, the attribute names "full name" "address" and "phone number" about the customer duplicates with the entity "order" and the entity "store customer information". When the attribute name duplicates between the plurality of entities, a man-hour is needed for an operation and a maintenance.

The relation map Pa1 in FIG. 2B is a diagram illustrating the relation between the entity and the attribute name in the AsIs schema Sa1. The solid line in FIG. 2B indicates correspondence relation between the entity Em and the attribute name Es belonging to the entity Em. In addition, the dotted line indicates the correspondence relation between the entity Em and the parenthesis attribute name to be able to refer to other entities. In addition, circles Ema, Emb and Emc in FIG. 2B includes the entity Em and the attribute name Es belonging to the entity Em, each. For example, the circle Ema in the map Pa1 includes the entity "order" Em and the attribute name "order date", "full name", "age", "address", "school district", "phone number" and "FAX" Es. Other circles Emb and Emc are similar, too.

Because the entity of the schema, which made semi-orthogonal, has an independent concept, the entities do not have a same attribute name each other. In other words, the schema, which is not made semi-orthogonal, has an attribute name which has correspondence relation with a plurality of entities. According to the relation map Pa1 in FIG. 2B, the attribute names "address", "full name", and "phone number" Es belong to the circles Emb and Emc of the plurality of entities "orders" and "store customer information". Therefore, according to the relation map Pa1, it is indicated that the AsIs schema Sa1 is not made the semi-orthogonal.

Here, a change of the address of the customer at the time of the operation will be explained as needing a man-hour for the operation and the maintenance, for example. When changing the address of the customer, the teaching materials sale system updates both values of the attribute name "address" of the entity "order" and the attribute name "address" of the entity "store customer information". However, the attribute name "address" of the entity "order" and the attribute name "address" of the entity "store customer information" have true data each other. Therefore, the true data of the attribute name "address" of the entity "order" may be different from the true data of the attribute name "address" of the entity "store customer information".

Specially, for example, even if the same address is indicated, the number address written by the Chinese numerals notation may be stored in the attribute name "address" of the entity "order", while the number address written by the numeral notation may be stored in the attribute name "address" of the entity "store customer information". In addition, for example, when the address of the customer is changed on the way, the address after the change may be stored in the attribute name "address" of the entity "order", while the address before the change may be stored in the attribute name "address" of the entity "store customer information".

The teaching materials sale system, when the attribute name "address" belongs to both of the entity "order" and the entity "store customer information", processes the update of address data after judged that each attribute name "address" indicates to the same address. Therefore, the teaching material sale system is added the processing to determine whether it is the same address and a man-hour occurs. In addition, when a target customer, which updates an address, carries out plural orders, because an attribute name "address" for each data of the plural entity "store customer information" becomes a target of the update in addition the attribute name "address" of the data of the entity "order", it is easy to produce an update mistake.

FIG. 3A and FIG. 3B are diagrams illustrating an example of ToBe schema SU corresponding to the AsIs schema in FIG. 2A and FIG. 2B and the semi-orthogonal state of the schema. ToBe schema St1 of FIG. 3A is the schema that is generated by making the AsIs schema Sa1 of FIG. 2A semi-orthogonality. In addition, the attribute name surrounded in a parenthesis in ToBe schema SU in FIG. 3A is the ID number to refer to other entities as described above. The attribute name "(product number)" in the ToBe schema St in FIG. 3A is identification information to be able to refer to the data of the entity "product", as mentioned above.

Specially, in data system of the ToBe schema SU in FIG. 3A, the attribute names "full name", "address" and "phone number" about the customer belong to only entity "customer". In other words, the entities do not have a same attribute name each other.

FIG. 3B illustrates the relation diagram Pt1 between the entity and the attribute name of the ToBe schema St1. As same as FIG. 2B, the solid line in the relation diagram Pt1 indicates the correspondence with the entity Em and the attribute name Es to belong to the entity Em. In addition, the dotted line in the relation diagram Pt1 indicates the correspondence with the entity Em and the parenthesis attribute name to be able to refer to other entities. In addition, the circles Emd-Emg in the relation map Pt1 includes the entity Em and the attribute name Es to belong to the entity Em concerned each.

Because the ToBe schema St1 in FIG. 3A is made the semi-orthogonal, the attribute name belongs to only one entity. For example, the attribute name "address", "full name" and "phone number" Es to belong to the plural entities "orders" and "store customer information" in the AsIs schema Sa1 in FIG. 2A, belongs to only the circle Emf of one entity "customer" in the relation map Pt1 in FIG. 3B. In addition, in the relation map Pt1 in FIG. 3B, the number of the entity increases and there are few numbers of the attribute name Es for one entity Em, relative to the relation map Pa1 in FIG. 2B. This status represents that each entity of the ToBe schema St1 in FIG. 3A has an independent concept.

When changing the address of the customer based on the schema which is made the semi-orthogonal, the teaching materials sale system update only the true data of the attribute name "address" of the entity "customer", and it is hard to produce an update error. Because the attribute name does not duplicate between plural entities according to the data system of the ToBe schema SU in FIG. 3A, the operation and the maintenance are easy.

FIG. 4A and FIG. 4B are diagrams illustrating another example of the AsIs schema Sa and the semi-orthogonal state of the schema. A schema in FIG. 4A and FIG. 4B is the schema which is added the requirement to be able to demand plural orders in a lump, in the middle of the operation. As same as FIG. 2A, FIG. 2B, FIG. 3A and FIG. 3B, the attribute name surrounded in a parenthesis in the AsIs schema Sa2 in FIG. 4A is the ID number to refer to other entities. The AsIs schema Sa2 in FIG. 4A further has the attribute names "request destination number" and "parent-request destination number" of the entity "order", relative to the AsIs schema Sa1 in FIG. 2A. it is possible to demand plural orders in a lump by adding the attribute names "request destination number" and "parent-request destination number" to the entity "order".

For example, a case that in the plurality of orders, one order is the order of the parent and the order except the one order is the order of the child is examped. Specially, the teaching materials sale system gives the data of the attribute name "request destination number" of the order of the parent to the attribute name "parent-request destination number" of the order of the child. And it is possible that the teaching materials sale system, by recognizing that the order to have data to the attribute name "parent-request destination number" is the order of the child, unify the request ahead of the orders of the parent and the child to the request destination of the order of the parent.

However, when the entity "order" has the attribute names "request destination number" and "parent-request destination number", the parenthood of the orders may circulate. When, a case that the parenthood of the orders circulates, for example, is a case the attribute name "parent-request destination number" of the order of the parent has the data of the attribute name "request destination number" of the order of the child. In this case, the order of the parent and the order of the child circulate, thereby it is difficult to identify the order of the parent. Therefore the teaching materials sale system has to confirm whether the parenthood of the orders does not circulate at the time of the update of data. The addition of the confirmation process of whether or not the parenthood of the orders circulates, causes the complexity of the existing teaching materials sale system, and big influence occurs to the teaching materials sale system. In other words, a reduction in development efficiency and maintenance efficiency of the teaching materials sale system, and a reduction in quality of the teaching materials sale system occur.

FIG. 4B illustrates the relation map Pa2 of the relation between the entity and the attribute name of the AsIs schema Sa1. A solid line and the dotted line in the relation map Pa2 are similar to that in FIG. 2B and FIG. 3B. In addition, the circles Emh-Emj in the relation map Pa2 include the entity Em and the attribute name Es to belong to the entity Em concerned each. Because the AsIs schema Sa2 in FIG. 4A is not made the semi-orthogonal, according to the relation map Pa2 concerned, the attribute name "address", "full name" and "phone number" Es belong to the circles Emh and Emj of the plural entity "orders" and "store customer information".

FIG. 5A and FIG. 5B are diagrams illustrating an example of the ToBe schema St2 corresponding to the AsIs schema in FIG. 4A and FIG. 4B and the semi-orthogonal state of the schema. The ToBe schema St2 of FIG. 5A is the schema that is generated by making the AsIs schema Sa2 of FIG. 2A semi-orthogonal. In addition, the attribute name surrounded in a parenthesis in the ToBe schema St2 in FIG. 5A is the ID number to refer to other entities as described above.

Specially, data system of the ToBe schema St2 in FIG. 5A has the entity "request destination". In the data system of the ToBe schema St2 in FIG. 5A, the entity "order" has the attribute name "request destination number" which is able to refer to the data of the entity "request destination". By adding the data of the attribute name "request destination number" of the entity "request destination" which is a request destination to the attribute name "request destination number" of the plurality of orders which are wanted to unify, it is possible that the teaching materials sale system requests the plurality of orders in a lump.

FIG. 5B illustrates the relation map Pt2 between the entity and the attribute name of the ToBe schema St2. The solid line and the dotted line in the relation diagram Pt2 indicates as same as that in FIG. 2B-FIG. 4B. In addition, the circles Emk-Emo in the relation map Pt2 includes the entity Em and the attribute name Es to belong to the entity Em concerned each. Because the ToBe schema St2 in FIG. 5A is made the semi-orthogonal, the attribute name belongs to only one entity. For example, the attribute names "address", "full name" and "phone number" Es which belong to plural entities "orders" and "store customer information" in the AsIs schema Sa2 in FIG. 4A belong to the circle Emm and Emo of one of entities "customer" and "request destination" in the relation map Pt2 in FIG. 5B concerned.

In addition, in the relation map Pt2 in FIG. 5B, the number of the entity increases and there are few numbers of the attribute name Es for one entity Em, relative to the relation map Pa2 in FIG. 4B concerned. This map represents that each entity of the ToBe schema St2 in FIG. 5A has an independent concept.

Therefore, when the system has data system of the ToBe schema St2 in FIG. 5A, the teaching materials sale system does not have to confirm whether or not the parenthood of the orders circulates, and the influence to existing teaching materials sale system is small. In addition, at the time of operation, the teaching materials sale system has only to give the same data to the attribute name "request destination number" of plural orders of which the request destination are same. Therefore, according to the data system of ToBe schema St2, it is evaded that the operation and the maintenance of the teaching materials sale system makes complexity by the addition of requirements.

(Semi-Orthogonal of Data System)

FIG. 6A and FIG. 6B are diagrams explaining the semi-orthogonal process of data system. In FIG. 6A and FIG. 6B, the circle is equivalent to the attribute name Es, and the rectangular correspond to the entity Em. FIG. 6A is a diagram illustrating connection between the attribute names Es, and FIG. 6B is a diagram illustrating a relation between the attribute name Es and the entity Em. A solid line and a dotted line in FIG. 6B indicate similar to FIG. 2B-FIG. 5B.

The semi-orthogonal of the data system means to select a combination of the entities Em which does not have same attribute name Es each other and has an independent concept, for example. The combination of the entities Em having an independent concept means a combination of the entities Em which has low similar degree. Each attribute name Es is hard to assume to delete the attribute name, because the attribute name Es corresponds with true data. Therefore, the semi-orthogonal process of the data system according to the present embodiment means the processing to let the existing plural attribute names Es to correspond with either new or existing entity Em.

As represented by FIG. 6A, there is a clustering technology, as a technique to perform grouping of a plurality of elements (attribute name) Es. However, the clustering technology is a technique to perform grouping of the element (attribute name) Es, in which a distance is close, based on the distance between the elements (attribute name) Es. In contrast, as represented by FIG. 6B, the semi-orthogonal of the data system generates correspondence relation of the attribute name Es and the entity Em based on a relation degree (distance) between the attribute name Es and the entity Em. In addition, the data system of the present AsIs schema has unnecessary entity Em while having a short entity Em. Therefore, it is not easy to judge the relation degree (distance) between the attribute name Es and the entity Em concerned, and the clustering technology is not applicable to the semi-orthogonal processing of the data system.

A database reconfiguration device 10 according to the present embodiment extracts a plurality of entity candidates based on first information about an attribute name which are included in one of a plurality of databases, and the relation degree between the attribute name and the entity. Each of the plurality of databases includes an entity having a correspondence relation with the plurality of attribute names. And the database reconfiguration device 10 identifies a plurality of entity candidate groups, in which the entity candidate group is constructed by a plurality of entities extracted and the entities in the entity candidate group has correspondence relation with all attribute names by having the correspondence relation with either one of the plurality of attribute names by the entities in the entity candidate group, and the number of entity candidates in the entity candidate group is minimum. Then, the database reconfiguration device 10 identifies the entity candidate group, in which the total of the relation degree between the candidate entities included in the entity candidate group is maximum, based on second information about the relation degree between the entities, among the identified plural entity candidate groups. And the database reconfiguration device 10 assigns each of a plural attribute names, based on the first information, so as to have relation to either of the candidate entities constituting the entity candidate group.

In other words, the database reconfiguration device 10 extracts the plurality of entity candidates based on the attribute names and selects correspondence relation with the attribute name and the entity candidate. Thereby, it is possible to make the data system the semi-orthogonal based on the attribute name without needing true data even if the number of entity has over and short, and to reconstitute the database. In addition, in the present embodiment, the database has one entity and plural attribute names. But, the embodiment is not limited to this example, and the database may have plural entities.

(Construction of Database Reconfiguration Device)

Figure 7:
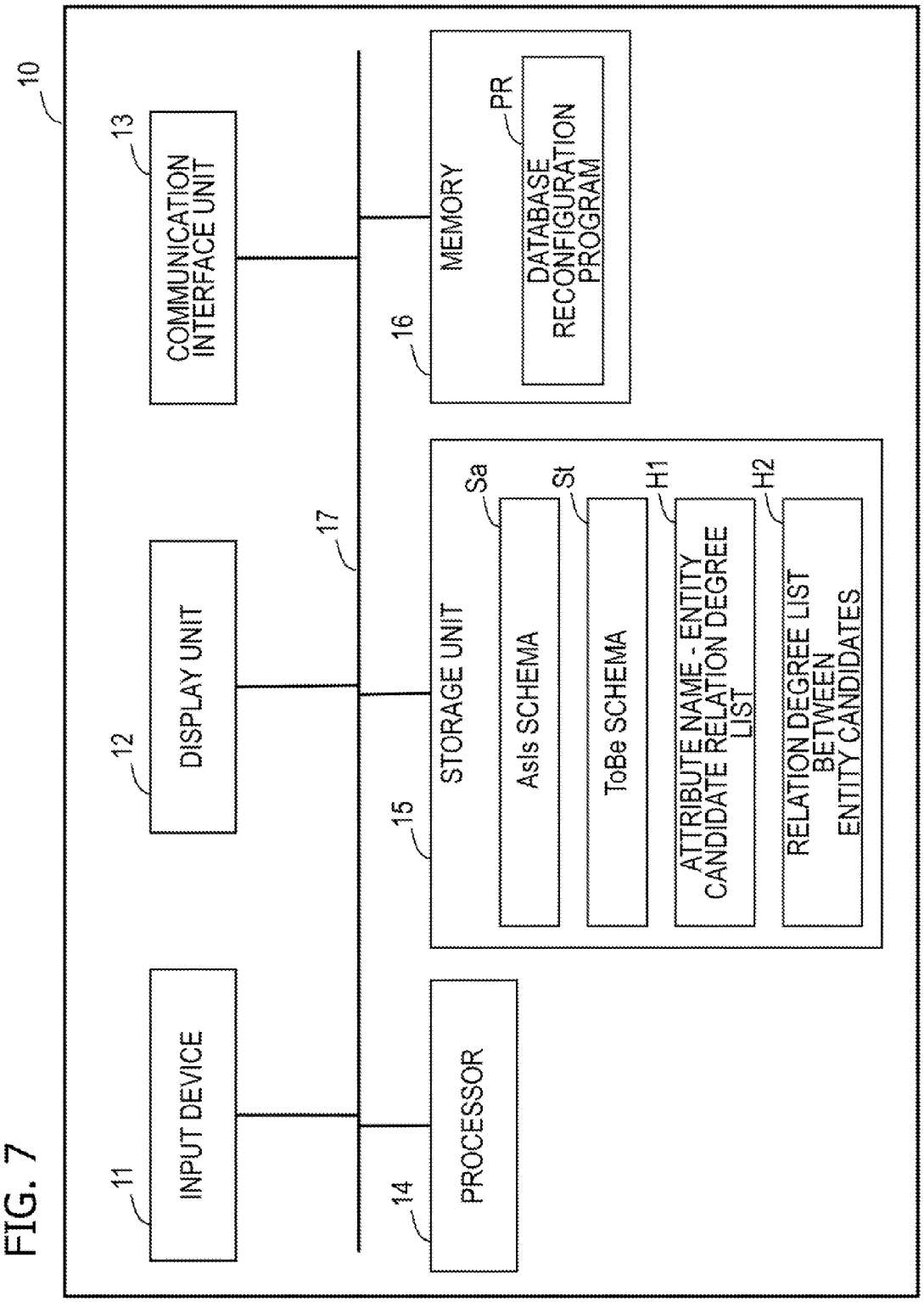
FIG. 7 is a block diagram illustrating an example of the constitution of the database reconfiguration device 10 according to the present embodiment.

FIG. 7 is a block diagram illustrating an example of the constitution of the database reconfiguration device 10 according to the present embodiment. The database reconfiguration device 10 in FIG. 7 has an input device 11, a display unit 12, a communication interface unit 13, a processor 14, a storage unit (medium) 15, and a memory 16, for example. The all components are connected through a bus 17 each other. The input device 11 includes, for example, a keyboard or a mouse, and the display unit 12 includes a display screen such as display panel.

In addition, the storage unit 15 stores a database reconfiguration program PR. The processor 14 loads the database reconfiguration program PR in the memory 16 at the time of operation and collaborates with the database reconfiguration program PR, and carries out the semi-orthogonal process of the data system by an input of the AsIs schema Sa which is retrieved from the storage unit 15. And the database reconfiguration program PR generates the ToBe schema St on the memory 16 and outputs it to the storage unit 15. In addition, the storage unit 15 has an attribute name-entity candidate relation degree list H1 and a relation degree list H2 between entity candidates which are referred by the database reconfiguration program PR.

(Program Block Diagram of Database Reconfiguration Device)

Figure 8:
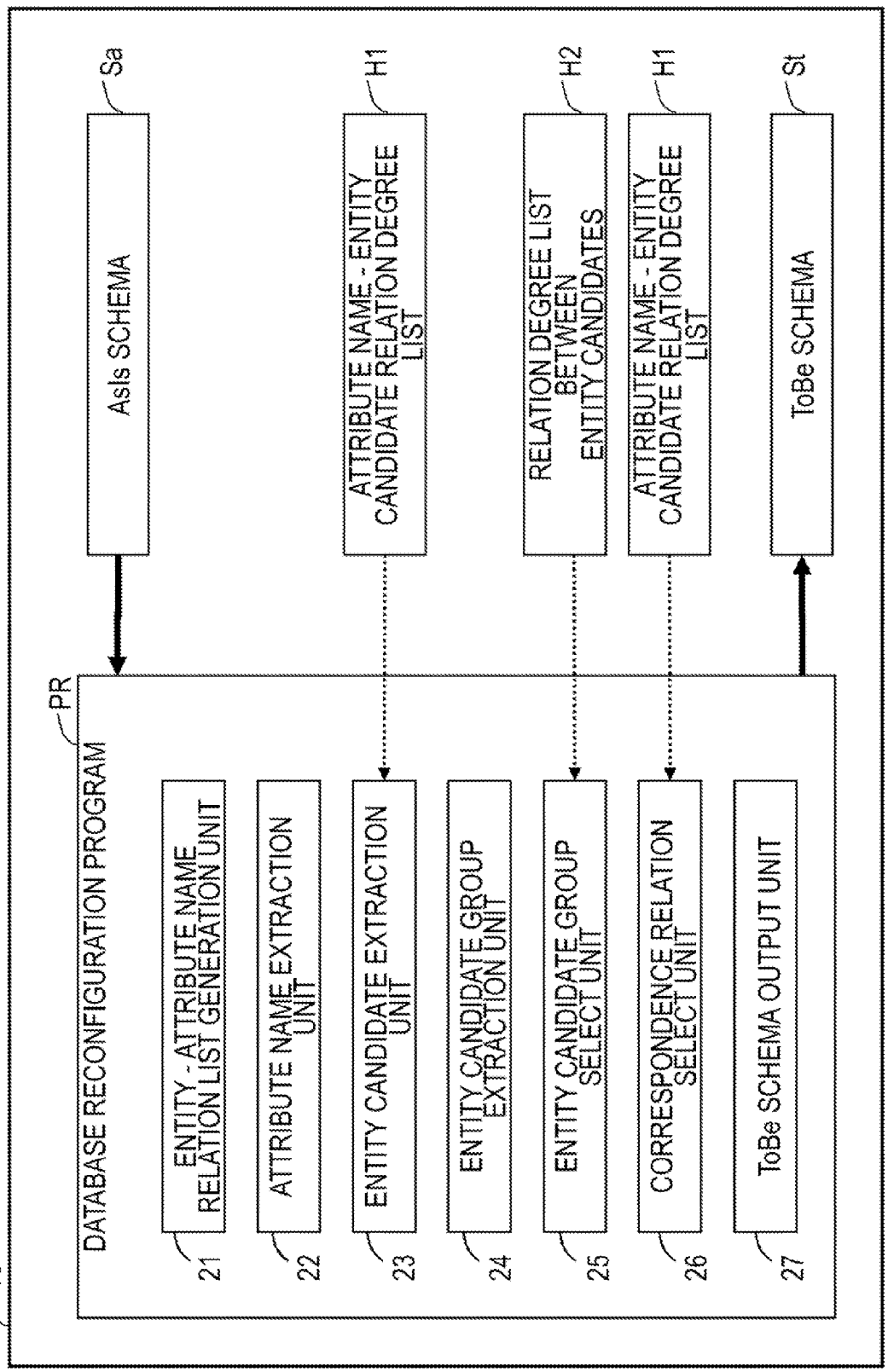
FIG. 8 is a program block diagram of the database reconfiguration device 10 illustrated by FIG. 7.

FIG. 8 is a program block diagram of the database reconfiguration device 10 illustrated by FIG. 7. The database reconfiguration program PR in the database reconfiguration device 10 in FIG. 8 has the entity-attribute name relation list generation unit 21, an attribute name extraction unit 22, an entity candidate extraction unit 23, an entity candidate group extraction unit 24, an entity candidate group select unit 25, correspondence relation select unit 26, and a ToBe schema output unit 27.

The entity-attribute name relation list generation unit 21 generates the entity-attribute name relation list based on the AsIs schema Sa. The attribute name extraction unit 22 extracts the list of a plurality of attribute names that a plurality of databases has based on the entity-attribute name relation list. The entity candidate extraction unit 23 extracts the correspondence relation with the candidate of one or more entities corresponding to attribute name each, based on the list of attribute names which is extracted, with reference to the attribute name-entity candidate relation degree list H1. The entity candidate group extraction unit 24 extracts the minimum set of the entity candidates, in which a combination of attribute names having the correspondence relation match with attribute names in the entity-attribute name relation list, from the entity candidate which is extracted.

In addition, the entity candidate group select unit 25 selects one combination of entity candidates among the plurality of a combination of entity candidates with reference to the relation degree list H2 between entity candidates concerned. The correspondence relation select unit 26, when there are multiple entity candidates corresponding to one attribute name, in other words, when the correspondence relation between the attribute name and the entity candidate duplicates, selects one correspondence relation with reference to the attribute name-entity candidate relation degree list H1. The ToBe schema output unit 27 outputs the entity candidates and the attribute names with the correspondence relation to the ToBe schema St.

(Flow Chart)

Figure 9:
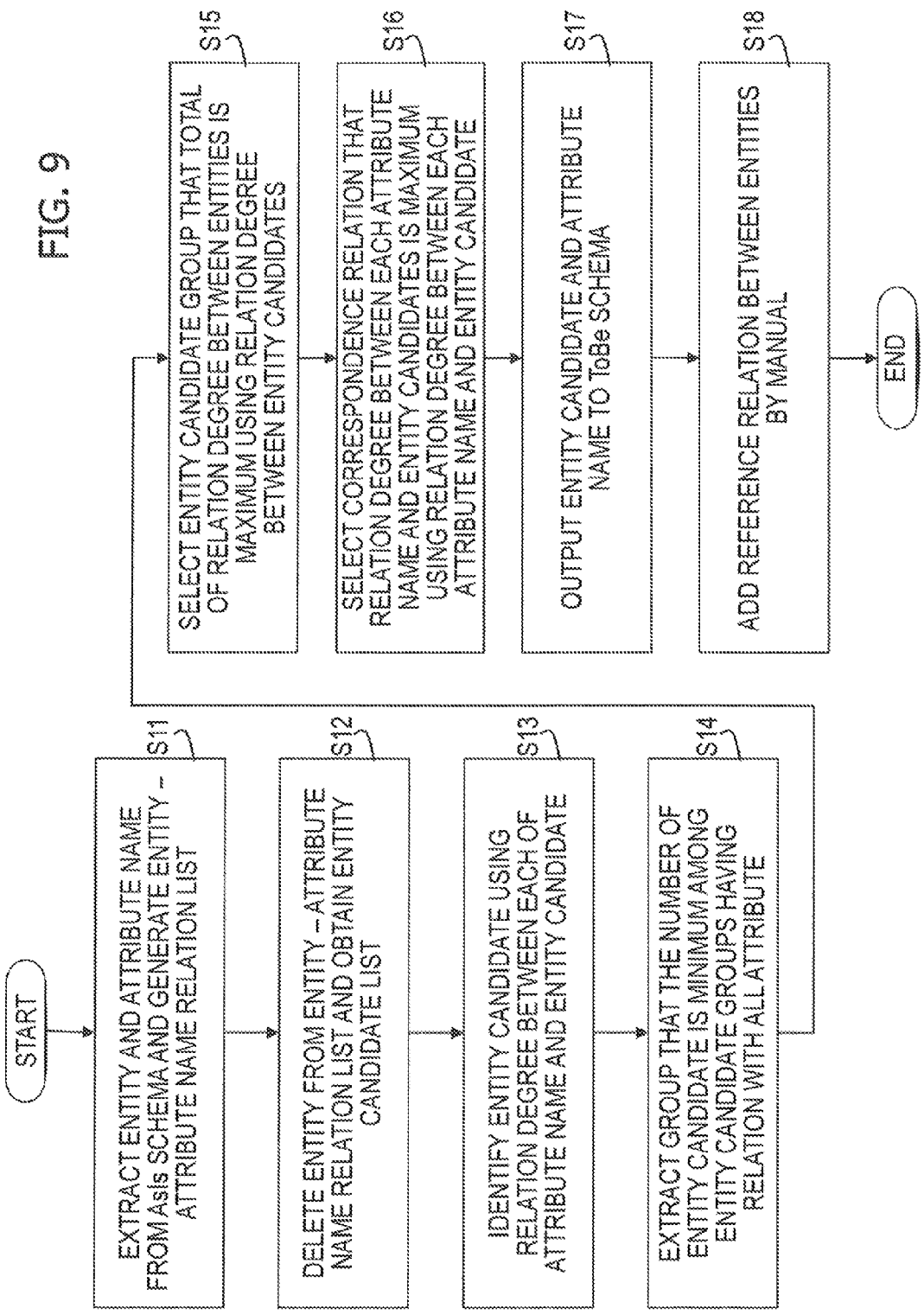
FIG. 9 is a diagram illustrating a flow chart of processing of the database reconfiguration device 10 according to the present embodiment.

FIG. 9 is a diagram illustrating a flow chart of processing of the database reconfiguration device 10 according to the present embodiment. More information on each process will be mentioned later in correspondence to a specific example. The entity-attribute name relation list generation unit 21 extracts the entities and the attribute names from the AsIs schema, and generates the entity-attribute name relation list (S11). Then, the attribute name extraction unit 22 deletes all entities from the entity-attribute name relation list which is generated by the step S11 (S12). The attribute name has true data while the entities include the unnecessary entity and the short entity. Therefore, the attribute name extraction unit 22 remains the attribute names and deletes the entities. In other words, the attribute name extraction unit 22 obtains the list of attribute names without the overlap by remaining an attribute names and removing the entities.

Then, the entity candidate extraction unit 23 guesses entity candidate corresponding to the attribute name based on the list of attribute names using the relation degree between an attribute name and an entity candidate and add the entity candidate (S13). In other words, the entity candidate extraction unit 23 comprehensively extracts the entity candidates based on the present list of attribute names.

Specially, the entity candidate extraction unit 23 extracts correspondence relation with one or more entity candidates corresponding to the attribute name, which has relation degree more than a predetermined value about each attribute name, with reference to the attribute name-entity candidate relation degree list H1 which is prepared beforehand. An entity candidate is any candidate. The entity candidate extraction unit 23 makes up for the lack of the entity by the process in the step S13.

Enormous entity candidates are enumerated in correspondence with the list of attribute names. Therefore, the entity candidate group extraction unit 24, among the entity candidate groups in which a set of the attribute names having the correspondence relation includes all attribute names, extracts the entity candidate group that a number of the entity candidate becomes minimum (S14). Specially, the entity candidate group extraction unit 24 extracts a combination of the entity candidate which has fewer entity candidates among the combinations of the entity candidate that the set of the attribute name having correspondence relation match with the attribute names in the entity-attribute name relation list. Because the grand total of the similar degree between entity candidates is small so that there is little number of entity candidates, it is assumed that the entity candidates have independent concept, each other. Therefore, it is possible that the entity candidate group extraction unit 24 extracts entity candidate group having an independent concept each other by extracting a combination of fewest entity candidates.

The combination of entity candidates may be extracted a plurality of patterns. Therefore, the entity candidate group select unit 25 selects the entity candidate group, that the grand total of the relation degree between the entity candidates becomes greatest, among the entity candidate groups which are extracted in the step S14, using the relation degree list between the entity candidates (S15). In other words, the entity candidate group select unit 25 cancels the redundancy of the entity candidate group. Specially, the entity candidate group select unit 25 selects a combination of entity candidates, which has a higher relation degree of the entity candidates, among a plurality of combination of entity candidates, with reference to the relation degree list H2 between the entity candidates. Because each entity candidate in the entity candidate group is used in the same specific business, it is assumed that the relation degree between the entity candidates, which are used in the same specific business, is high. Therefore, the entity candidate group select unit 25 selects the entity candidate group in which the relation degree between the entity candidates is highest and deletes other entity candidates.

In addition, the entity candidate in the selected entity candidate group may have the correspondence relation of same attribute name each other. Then, the correspondence relation select unit 26 decreases the duplicate correspondence relation about the attribute name having redundant correspondence relations with a plurality of entity candidates (S16). Specially, the correspondence relation select unit 26 selects the correspondence relation, in which the relation degree between corresponding entity candidates becomes greatest, with reference to the attribute name-entity candidate relation degree list H1 by each of the attribute names having the correspondence relation with the plurality of entity candidates. It is assumed that the relation degree between the entity candidates, which are used in the same specific business, is high. Therefore, the correspondence relation select unit 26 selects the correspondence relation, in which the relation degree between the attribute name and corresponding entity candidate becomes greatest, and deletes other correspondence relations.

As a result of the step S16, each entity candidate has the correspondence relation with different combination of the attribute names each other and does not have a correspondence relation with a same attribute name. In addition, an entity candidate has an independent concept each other, because the number of entity candidates is a minimum. Therefore, it is possible that the database reconfiguration device 10 obtains the entity candidate group which does not have the correspondence relation with same attribute name each other and has an independent concept each other according to the steps S11-S16. In other words, it is possible that the database reconfiguration device 10 acquires the correspondence relation with an entity candidate and the attribute name which are made the semi-orthogonal by the steps S11-S16.

The ToBe schema output unit 27 outputs the correspondence relations with the entity candidate and the attribute name, which is acquired by the steps S11-S16, to the ToBe schema (S17). Then the user supplies, for example, the reference relations between the entities by manual (S18). The details will be mentioned later.

Each processing which are illustrated by the flow chart in FIG. 9 will be explained to cope with a specific example.

Specific Example: Step S11 in FIG. 9

FIG. 10 is a diagram indicating an example of the entity-attribute name relation list T1 which is generated by the step S11 in FIG. 9. The entity-attribute name relation list T1 in FIG. 10 has the row of entities and the line of the attribute names. In addition, in the entity-attribute name relation list T1, circles indicates that an entity and an attribute name have correspondence relation. As illustrated by the flow chart in FIG. 9, firstly the entity-attribute name relation list generation unit 21 extracts the entities and the attribute names from the AsIs schema which is exemplified in FIG. 2 and generates the entity-attribute name relation list T1 (S11 in FIG. 9).

The AsIs schema Sa1 in FIG. 2 has "order", "product", and "store customer information" as an entity. In addition, the AsIs schema Sa1 in FIG. 2 has "order date", "full name", "age", "address", "school district", "phone number" and "FAX" as attribute names of the entity "order", "product number", "amount", "brand name" and "unit price" as attribute names of the entity "product", and "full name", "address" and "phone number" as attribute names of the entity "store customer information". The entity-attribute name relation list generation unit 21 writes an entity and an attribute name in the AsIs schema Sa1 of FIG. 2 in an entity and an attribute name in the entity-attribute name relation list T1 each.

In addition, the entity-attribute name relation list generation unit 21 writes only one attribute name when there is an attribute name which is redundant between the plurality of entities. In the AsIs schema Sa1 of FIG. 2, the "full name", "address" and "phone number" repeat between the entity "order" and the entity "store customer information". Therefore, the entity-attribute name relation list generation unit 21 generates the entity-attribute name relation list T1 which is gathered attribute names "full name", "address" and "phone number" in one.

And the entity-attribute name relation list generation unit 21 writes the correspondence relations between the entity and the attribute name in the AsIs schema Sa1 in the entity-attribute name relation list T1 by circle marks. The attribute names "full name", "address" and "phone number" are gathered by one. Therefore, the attribute names "full name", "address" and "phone number" have correspondence relation with the entity "order" and the entity "store customer information" each.

Specific Example: Step S12 in FIG. 9

As explained by the flow chart in FIG. 9, the attribute name extraction unit 22 deletes all entities from the entity-attribute name relation list T1 which is generated by the step S11 (S12). Specially, the attribute name extraction unit 22 deletes the entities in the entity-attribute name relation list T1 in FIG. 10, and deletes the correspondence relations with the entity and the attribute name in the entity-attribute name relation list T1, thereby acquire the list of attribute names that there is not overlap.

FIG. 11 is a diagram indicating an example of the list of attribute names generated by the step S12 in FIG. 9. The list of attribute names in FIG. 11 represents an attribute name group that there is not the overlap that the entity-attribute name relation list T1 in FIG. 10 has. When the semi-orthogonal intends for the data system of the existing teaching materials sale system, each attribute name, in which the AsIs schema has, has true data. Therefore, when performing the semi-orthogonal, the attribute name extraction unit 22 does not decrease the attribute name. On the other hand, the entities which the AsIs schema has include a short entity and unnecessary entity. Therefore, the attribute name extraction unit 22 remains the attribute names and deletes the entities and the correspondence relations with the entity and the attribute name from the entity-attribute name relation list T2.

Figure 12:
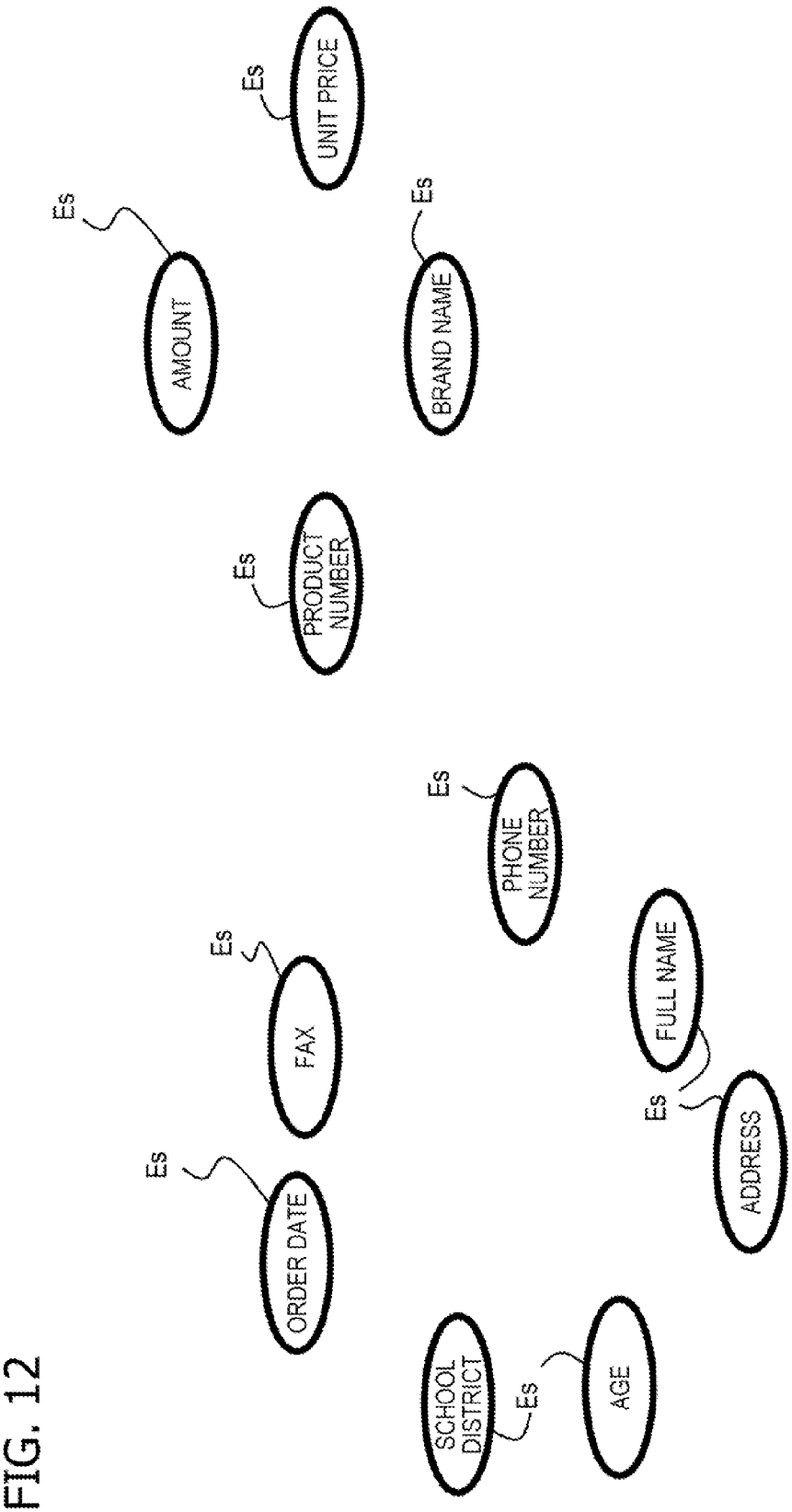
FIG. 12 is a diagram explaining the list of attribute names depicted by FIG. 11 based on the relation map.

FIG. 12 is a diagram explaining the list of attribute names depicted by FIG. 11 based on the relation map. The attribute name group illustrated in FIG. 12 is a list of the attribute names Es which is removed the entities Em from the relation map Pa1 depicted by FIG. 2. Each attribute name Es does not have correspondence relation with the entity Em in FIG. 12. And the entity candidate extraction unit 23 extracts new entity candidates based on the attribute names Es in FIG. 12 next. —Specific Example: Step S13 in FIG. 9

As explained by the flow chart in FIG. 9, the entity candidate extraction unit 23 guesses the entity candidate corresponding to the attribute name based on the list of attribute names using the relation degree between the attribute name and the entity candidate and adds the entity candidate, next (S13). Specially, the entity candidate extraction unit 23 extracts the correspondence relation with one or more entity candidates corresponding to the attribute name, which has the relation degree of more than the predetermined value, about each attribute name, with reference to the attribute name-entity candidate relation degree list H1 which is prepared beforehand. As described above, an entity candidate in the attribute name-entity candidate relation degree list H1 is any candidate. In addition, in the present embodiment, the relation degree is acquired based on one or both of co-occurrence use frequency with the attribute name and the entity candidate, and a similarity degree of the attribute name and the entity candidate.

FIG. 13 is a diagram indicating an example of the attribute name-entity candidate relation degree list H1 according to the present embodiment. Specially, the attribute name-entity candidate relation degree list H1 in FIG. 13 is an example of the relation degree list which is generated based on the co-occurrence use frequency with the attribute name and the entity candidate. The attribute name-entity candidate relation degree list H1 in FIG. 13 is generated based on a hit number when searched "(attribute name) of *" using a search engine in the Web as a search keyword. The "* (asterisk)" in the "(attribute name) of *" is a wild card indicating the entity candidate. For example, the search keyword is "order date for *" when the attribute name is the order date. Any entity candidate is extracted based on a search hit number when searched the search keyword "order date for *" by a search engine in the Web. With this entity candidate, it is possible to detect the number of Web pages, namely the use frequency, in which each extracted entity candidate and the attribute name "order date" are used for with connection.

In addition, the co-occurrence use frequency in the attribute name-entity candidate relation degree list H1 in FIG. 13 is acquired based on a hit number when searched it using the search engine in the Web, but the co-occurrence use frequency may be acquired based on a commercial co-occurrence frequency dictionary. In addition, the relation degree in the attribute name-entity candidate relation degree list H1 concerned may be based on a similarity degree with the attribute name and the entity candidate. For example, the similar degree with the attribute name and the entity candidate is acquired based on commercial thesaurus dictionary.

FIG. 14 is a diagram indicating an example of the entity-attribute name relation list T3 which is updated by the step S13 in FIG. 9. The attribute name in the entity-attribute name relation list T3 depicted by FIG. 14 corresponds to an attribute name acquired by the step S12. In addition, the entity-attribute name relation list T3 depicted by FIG. 14 exemplifies "order", "product", "customer", "buyer" and "school" as entity candidate, but, the number of the entity candidate is really with enormous numbers.

The entity candidate extraction unit 23 refers to the attribute name-entity candidate relation degree list H1 as exemplified in FIG. 13, for each attribute name, and searches a matching line with the attribute name in the entity-attribute name relation list T3. And the entity candidate extraction unit 23 adds a entity, in which a relation degree with the attribute name (in the example of FIG. 13, co-occurrence use frequency) is high, as the entity candidate in the entity-attribute name relation list T3. And the entity candidate extraction unit 23 writes a circle, which indicates that the attribute name and the entity candidate have correspondence relation, in the entity-attribute name relation list 13. The entity candidate extraction unit 23 extracts the entity candidate based on the absolute index that the relation degree is more than a predetermined standard value, or the relative index that the relation degree is greater than a average value of relation degrees of all entity candidates or an appointed ratio of the greatest relation degree, for example. Or, the entity candidate extraction unit 23 may extract the predetermined number of the entity candidates from the high rank about each attribute name.

In an example of FIG. 14, the entity candidate extraction unit 23 acquires a entity candidate "order" from a large number of entity candidates such as the entity candidate "order", "products", based on the attribute name-entity candidate relation degree list 111 which is exemplified in FIG. 13, about the attribute name "order date". And the entity candidate extraction unit 23 writes a circle to correspondence relation with the attribute name "order date" and entity candidate "order" in the entity-attribute name relation list 13 in FIG. 14. Similarly, the entity candidate extraction unit 23 acquires a entity candidate "customer", "buyer", "school" from the large number of entity candidates such as entity candidates "customer", "buyer" "school", based on the attribute name-entity candidate relation degree list H1 which is exemplified in FIG. 13, about the attribute name "address". And the entity candidate extraction unit 23 writes a circle to the each correspondence relation with the attribute name "address" and the entity candidates "customer", "buyer", "school" in the entity-attribute name relation list T3 in FIG. 14. It is similar about the other attributes name.

As described in FIG. 13 and FIG. 14, it is possible to acquire the relation degree based on objective information by obtaining the relation degree based on both or either one of the co-occurrence use frequency or similar degree. In addition, it is possible that the entity candidate extraction unit 23 comprehensively extracts more appropriate entity candidate based on the relation degree that is objective information than a case to present the entity candidate by a user, by extracting the entity candidate having the relation degree with the attribute name which is more than the predetermined value. Therefore, it is possible that the entity candidate extraction unit 23 makes up for the lack of the entity.

By executing the step S13 in FIG. 9, the entity candidate extraction unit 23 extracts the correspondence relation with the attribute name and one or more entity candidates which have high relation degree with the attribute name, about each attribute name. The entity candidate which is extracted is a entity candidate in the data system of the ToBe schema St.

Specific Example: Step S14 in FIG. 9

The entity candidate group extraction unit 24 extracts the entity candidate group (combination of entity candidates) that a number of the candidate entities becomes minimum, among the entity candidate groups of which set of the attribute name having the correspondence relation includes all attributes names (S14). Specially, the entity candidate group extraction unit 24 extracts a combination of fewest entity candidates of which a set of the attribute names having the correspondence relation match with the list of entity-attribute name relation list T3 (the order date, full name, age, address, school district, phone number, FAX, product number, amount, brand name, unit price). It is assumed that the grand total of the similar degree between the entity candidates becomes small so that the number of the entity candidates is small, the entity candidates have an independent concept each other. In addition, each entity candidate in the extracted entity candidate group may duplicate an attribute name having the correspondence relation each other.

FIG. 15A and FIG. 15B are the entity-attribute name relation lists indicating an example of two entity candidates group extracted by the step S14 in FIG. 9. FIG. 15A is a diagram illustrating the entity-attribute name relation list T4-1 having the first entity candidate group (A) and FIG. 15B is a diagram illustrating the entity-attribute name relation list T4-2 having the second entity candidate group (B).

The first entity candidate group (A) in the entity-attribute name relation list T4-1 has entity candidates "a: order", "b: product", "c: customer", "e: school". In addition, the set of the attribute name (order date, full name, age, address, school district, phone number, FAX, product number, amount, brand name, unit price), in which the entity candidates ("a: order", "b: product", "c: customer" and "e: school") in the first entity candidate group (A) have, match with the list of attribute names in the entity-attribute name relation list T3 generated by the step S13 in FIG. 9. In other words, the first entity candidate group (A) corresponds to the entity candidate group in which the set of the attribute name having correspondence relation includes all attributes names and a number of the entity candidates becomes minimum.

The second entity candidate group (B) in the entity-attribute name relation list T4-2 has entity candidates "a: order", "b: product", "d: buyer", "e: school". In addition, the set of the attribute names (order date, full name, age, address, school district, phone number, FAX, product number, amount, brand name, unit price), in which the entity candidates ("a: order", "b: product", "d: buyer" and "e: school") in the second entity candidate group (B) have, match with the list of attribute names in the entity-attribute name relation list T3 generated by the step S13 in FIG. 9. In other words, the second entity candidate group (B) corresponds to the entity candidate group in which the set of the attribute names having correspondence relation with the entity candidate includes all attribute names and a number of the entity candidates becomes minimum.

The entity candidate group extraction unit 24 evades that the data systems after the reconfiguration become enormous by selecting the entity candidate group having minimum entity candidates and acquires entity candidate group having an independent concept each other. The entity candidate group extraction unit 24 may extract a plurality of entity candidate groups (in this example, the entity candidate groups (A) and (B)).

Figure 16A:
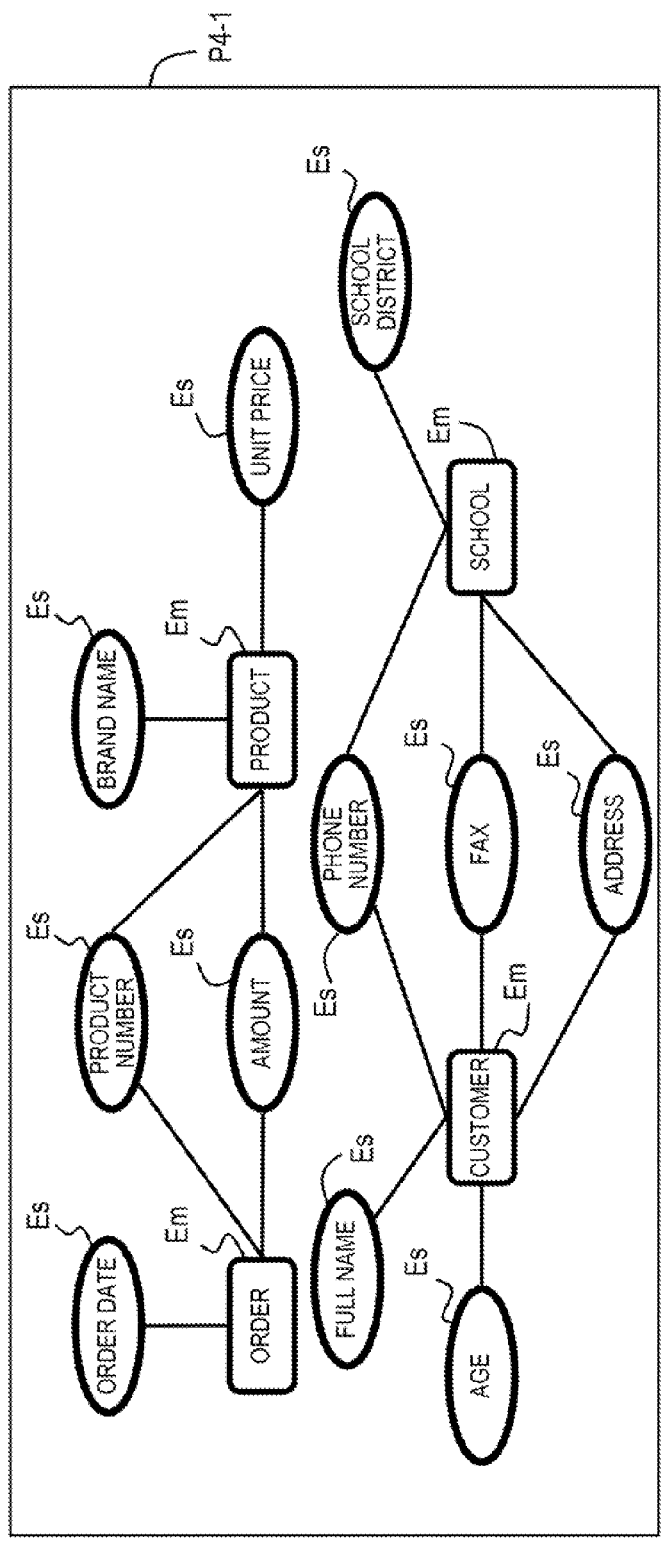
FIG. 16A and FIG. 16B are diagrams explaining the entity candidate group depicted by FIG. 15A and FIG. 15B based on a relation map.
Figure 16B:
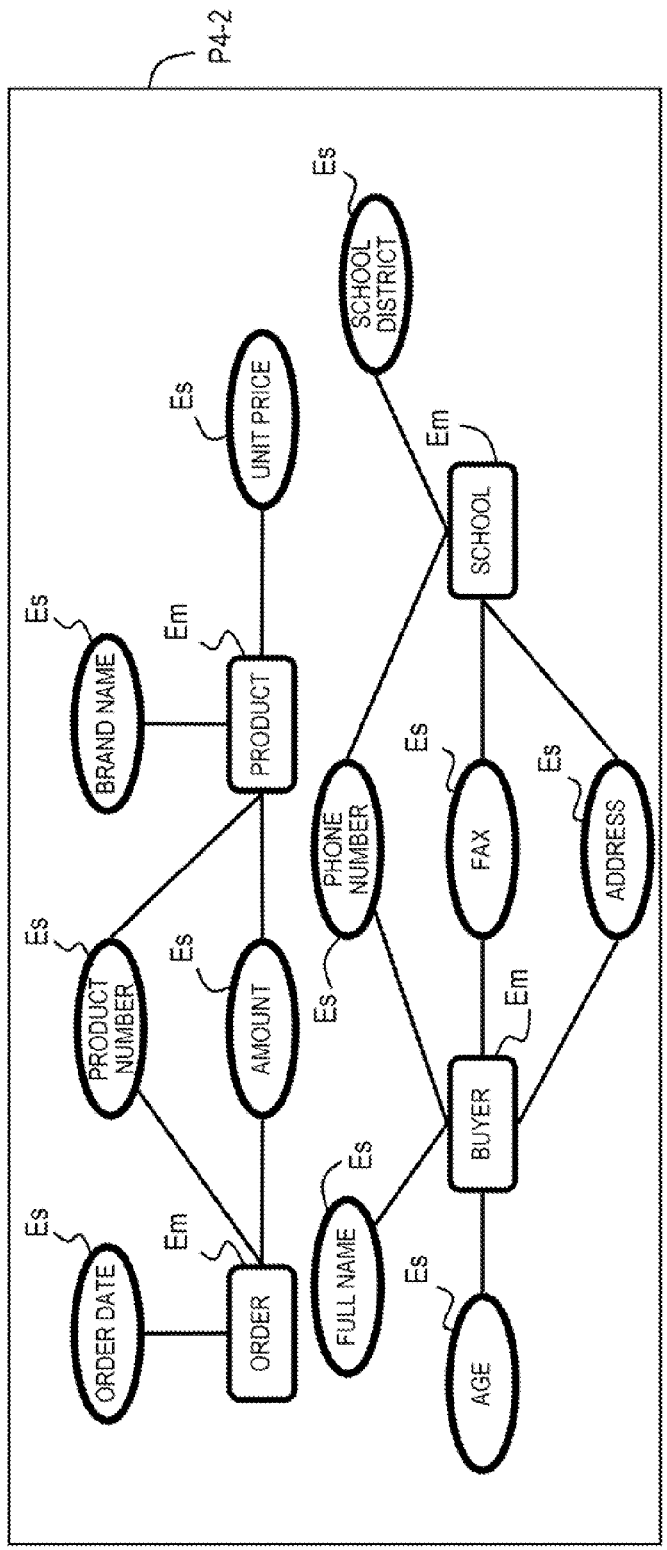

FIG. 16A and FIG. 16B are diagrams explaining the entity candidate group depicted by FIG. 15A and FIG. 15B based on a relation map. FIG. 16A illustrates the relation map P4-1 corresponding to the entity-attribute name relation list T4-1, and FIG. 16B illustrates the relation map P4-2 corresponding to the entity-attribute name relation list T4-2. The relation maps P4-1, P4-2 have correspondence relation with the attribute name Es and the entity candidate of the entity candidate group each. According to FIG. 16, a part of the attribute name Es has the correspondence relation with a plurality of entity candidate Em in the step S14.

Specific Example: Step S15 in FIG. 9

Then, the entity candidate group select unit 25 extracts the entity candidate group that the grand total of the relation degree between the entity candidates in the entity candidate group becomes greatest, among the entity candidate groups (A) and (B) which are extracted by the step S14, using the relation degree between the entity candidates in each entity candidate group (S15). Specially, the entity candidate group select unit 25 selects the entity candidate group in which the relation degree between the entity candidates is higher among the entity candidate groups (A) and (B) with reference to the relation degree list H2 between entity candidates.

In the present embodiment, the relation degree between the entity candidates concerned is acquired based on either one or both of the co-occurrence use frequency between entity candidates and the similar degree between the entity candidates. It is possible to acquire the relation degree between the entity candidates based on objective information by obtaining the relation degree between entity candidates concerned based on both or one of the co-occurrence use frequency and the similar degrees.

It is assumed that although each entity candidate, in the entity candidate group which are used in the same specific business, have an independent concept each, the relation degree is a high. Therefore, it is possible that the entity candidate group select unit 25 select the entity candidate group more appropriately based on the relation degree that is objective information, by selecting the entity candidate group in which the relation degree between entity candidates is higher.

FIG. 17 is a diagram indicating an example of relation degree list HZ between the entity candidates according to the present embodiment. Specially, the relation degree list H2 between entity candidates in FIG. 17 concerned is an example of the relation degree list generated based on the co-occurrence use frequency between the entity candidates. The relation degree list H2 between entity candidates in FIG. 17 is generated based on a hit number when searched the entity candidate such as "'first entity candidate' 'second entity candidate'" as the search keyword, using a search engine in the Web. For example, when the first search keyword is "order" and the second keyword is "order product", the search keyword is "order, order product". Based on a search hit number when searched the search keyword "order, order product" by the search engine in the Web, it is possible to detect the number of the Web page where the entity candidate "order" and the entity candidate "product" are used for at the same time, namely use frequency.

In addition, the co-occurrence use frequency in the relation degree list H2 between entity candidates depicted by FIG. 17 is acquired based on a hit number when searched it using the search engine in the Web, but the co-occurrence use frequency may be acquired based on a commercial co-occurrence frequency dictionary. In addition, the relation degree in the relation degree list H2 between entity candidates may be based on a similar degree between the entity candidates. For example, the similar degree between the entity candidates is acquired based on commercial thesaurus dictionary.

The entity candidate group select unit 25 acquires each relation degree (in the example of FIG. 17, use frequency) in mutual relations between the entity candidates in the entity candidate group, about the entity candidate groups (A) and (B) each, with reference to the relation degree list H2 between the entity candidates which is exemplified in FIG. 17. And the entity candidate group select unit 25 calculates the total of each relation degree of the relation between entity candidates each other in the entity candidate group, about each entity candidate groups (A) and (B). When the total is based on the relation degree list H2 between entity candidates in FIG. 17, the total of the relation degree in the entity candidate group (A) is bigger than the total of the relation degree in the entity candidate group (B). Therefore, the entity candidate group select unit 25 selects the entity candidate group (A) by the step S15.

Specific Example: Step S16 in FIG. 9

Then, the correspondence relation select unit 26 decreases redundant correspondence relation about the attribute name having correspondence relation with the plurality of entity candidates (S16). Specially, the correspondence relation select unit 26 selects the correspondence relation which has higher relation degree between corresponding entity candidate, namely, which has high degree to be used in the same specific business, with reference to the attribute name-entity candidate relation degree list H1 which is depicted by FIG. 13, about each attribute name having the correspondence relation with the plurality of entity candidates. It is assumed that the relation degree with the entity candidate and the attribute name, which are used in the same specific business, is a high.

FIG. 18A and FIG. 18B are diagrams explaining selection process (step S16 in FIG. 9) of the correspondence relation between the attribute name and the entity candidate. The entity-attribute name relation list T4-1 in FIG. 18A is the same as the entity-attribute name relation list T4-1 in FIG. 15A. In the entity-attribute name relation list T4-1, the attribute name "address" has the correspondence relation with the entity candidate "customer" and the entity candidate "school". In other words, the attribute name "address" has the correspondence relation with the plurality of entity candidates in duplicate. According to the attribute name-entity candidate relation degree list H1 depicted by FIG. 13, the use frequency of the attribute name "address" and the entity candidate "customer" is bigger than the use frequency of the attribute name "address" and the entity candidate "school". Therefore, the correspondence relation select unit 26 selects the correspondence relation of the attribute name "address" and the entity candidate "customer" among the correspondence relation of the attribute name "address" and the entity candidate "customer" and the correspondence relation of the attribute name "address" and the entity candidate "school". As illustrated in FIG. 18B, the correspondence relation select unit 26 deletes the circle x1 indicating the correspondence relation of the attribute name "address" and the entity candidate "school" in the entity-attribute name relation list T5.

In addition, in the entity-attribute name relation list T4-1 in FIG. 18A, the attribute name "product number" has the correspondence relation with the entity candidate "order" and the entity candidate "product". In other words, the attribute name "product number" has the correspondence relation with the plurality of entity candidates in duplicate. According to the attribute name-entity candidate relation degree list H1 depicted by FIG. 13, the use frequency of the attribute name "product number" and the entity candidate "order" is smaller than the use frequency of the attribute name "product number" and the entity candidate "product". Therefore, the correspondence relation select unit 26 selects the correspondence relation of the attribute name "product number" and the entity candidate "product" and deletes the circle x2 indicating the correspondence relation of the attribute name "product number" and the entity candidate "order" in the entity-attribute name relation list T5, as illustrated in FIG. 18B. The correspondence relation select unit 26 processes it about the correspondence relation of the other attributes name having redundant correspondence relation (for example, phone number, FAX, amount) in the entity-attribute name relation list T4-1, as similar to above process.

As illustrated in FIG. 18B, the correspondence relation select unit 26 deletes overlap of the correspondence relation with the attribute name between the entity candidates. It is possible that the correspondence relation select unit 26 selects a more appropriate correspondence relation between the attribute name and the entity candidate, based on the relation degree that is objective information by choosing the correspondence relation in which the relation degree between the attribute name and the entity candidate is maximum. In addition, the correspondence relation select unit 26 acquires the entity candidate group having the correspondence relation with different attribute name group each other, namely the entity candidate group which does not have the correspondence relation with same attribute name each other, as a result of the process in the step S16.

Figure 19:
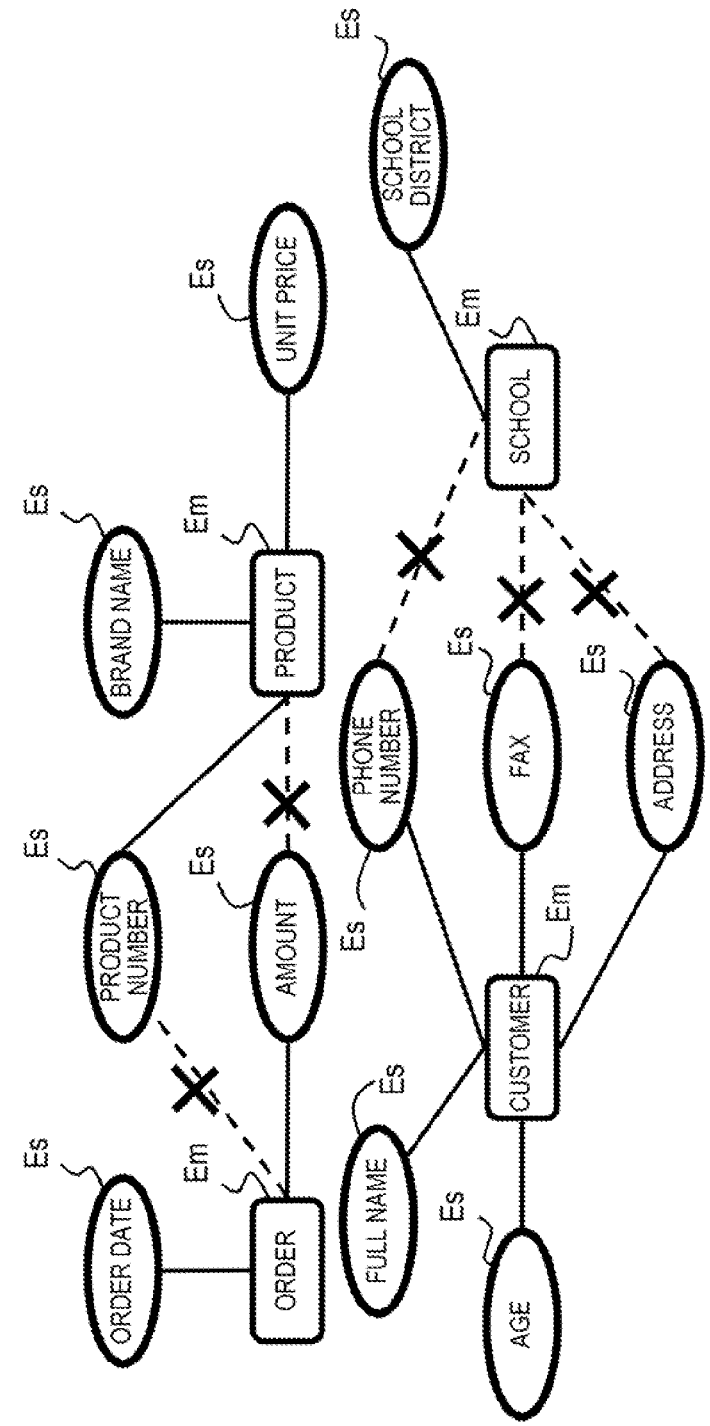
FIG. 19 is a diagram explaining the selection process of the correspondence relation between the attribute name and the entity candidate based on a relation map.

FIG. 19 is a diagram explaining the selection process of the correspondence relation between the attribute name and the entity candidate based on a relation map. In FIG. 19, each attribute names "product number", "amount", "phone number", "FAX", "address" Es has correspondence relation with only one entity candidate Em in which the relation degree is largest in the relation map P4-1 depicted by FIG. 16. In FIG. 19, the dashed line indicates deleted correspondence relation.

Specific Example: Step S17 in FIG. 9

Next, the ToBe schema output unit 27 outputs the correspondence relations with the entity candidate and the attribute name which is acquired by the steps S11-S16 to the ToBe schema (S17). Specially, the ToBe schema output unit 27 writes the entity candidate and the attribute name of the entity-attribute name relation list T5 in FIG. 14 into the entity and the attribute name in the ToBe schema each.

FIG. 20 is a diagram explaining data system of the ToBe schema Stx which is output by the step S17 in FIG. 9. The entity-attribute name relation list T5 in FIG. 18B has the correspondence relation between the entity candidate "order" and the attribute names "order date" and "amount". In addition, the entity candidate "product" has the correspondence relation with the attribute names "product number", "brand name" and "unit price". In addition, the entity candidate "customer" has the correspondence relation with the attribute names "full name", "age", "address", "phone number" and "FAX". In addition, the entity candidate "school" has the correspondence relation with the attribute name "school district". Therefore, the data system of the ToBe schema Stx in FIG. 20 has the entities and the attribute names and the correspondence relations with the entity and the attribute name as same as the entity-attribute name relation list T5 depicted by FIG. 18, too.

As illustrated in FIG. 20, the ToBe schema Stx has not the correspondence relation with same attribute name each other and has the entities "order", "product" and "customer" which have an independent concept each other Therefore, it is possible that the database reconfiguration device 10 generates the ToBe schema Stx which made the semi-orthogonal of the data system of the AsIs schema St1 depicted by FIG. 2, by the process in the steps S11-S16. The following process in the step S18 indicates the supplementary process in the reconfiguration of the database.

Specific Example: Step S18 in FIG. 9

Then, the user supplements the reference relations between the entity by hands, for example. Specially, when each entity of the ToBe schema does not have the identification information which identifies the data of the entity uniquely, the user adds an attribute name of the identification information such as "aaa ID" or "bbb number" to the entity. In addition, the user supplements the reference relations between the entities using the identification information of the entity.

FIG. 21 is a diagram indicating an example of the data system of the ToBe schema St1 where the reference relations between the entities are supplemented by the user. The ToBe schema al in FIG. 21 corresponds to the ToBe schema SU in FIG. 2. In addition, in the data system of the ToBe schema St1 in FIG. 21, the attribute name surrounded by a curly brace is an attribute name indicating the identification information to identify the data of the entity uniquely. Specially, the attribute name "order number" of the entity "order" is information to identify the plurality of data of the entity "order". Similarly, the attribute name "customer number" of the entity "customer" is identification information to identify the plurality of data of the entity "customer".

In addition, in an example of FIG. 21, the entity "order" refers to the data of the entities "product" and "customer". Accordingly, the entity "order" has the attribute names "product number" and "customer number" which identify the data of the associated entities "product" and "customer" uniquely. Similarly, the entity "customer" has an attribute name "school number" to identify the data of the associated entity "school" uniquely, because the entity "customer" refers to the data of the entity "school".

By performing the step S18, the data system which is made the semi-orthogonal is adjusted based on a schema. In addition, the reconfiguration process of the database according to the present embodiment (the steps S11 S18 in FIG. 9) is effective for the data system in which the attribute name circulates through between the entities.

Figure 22:
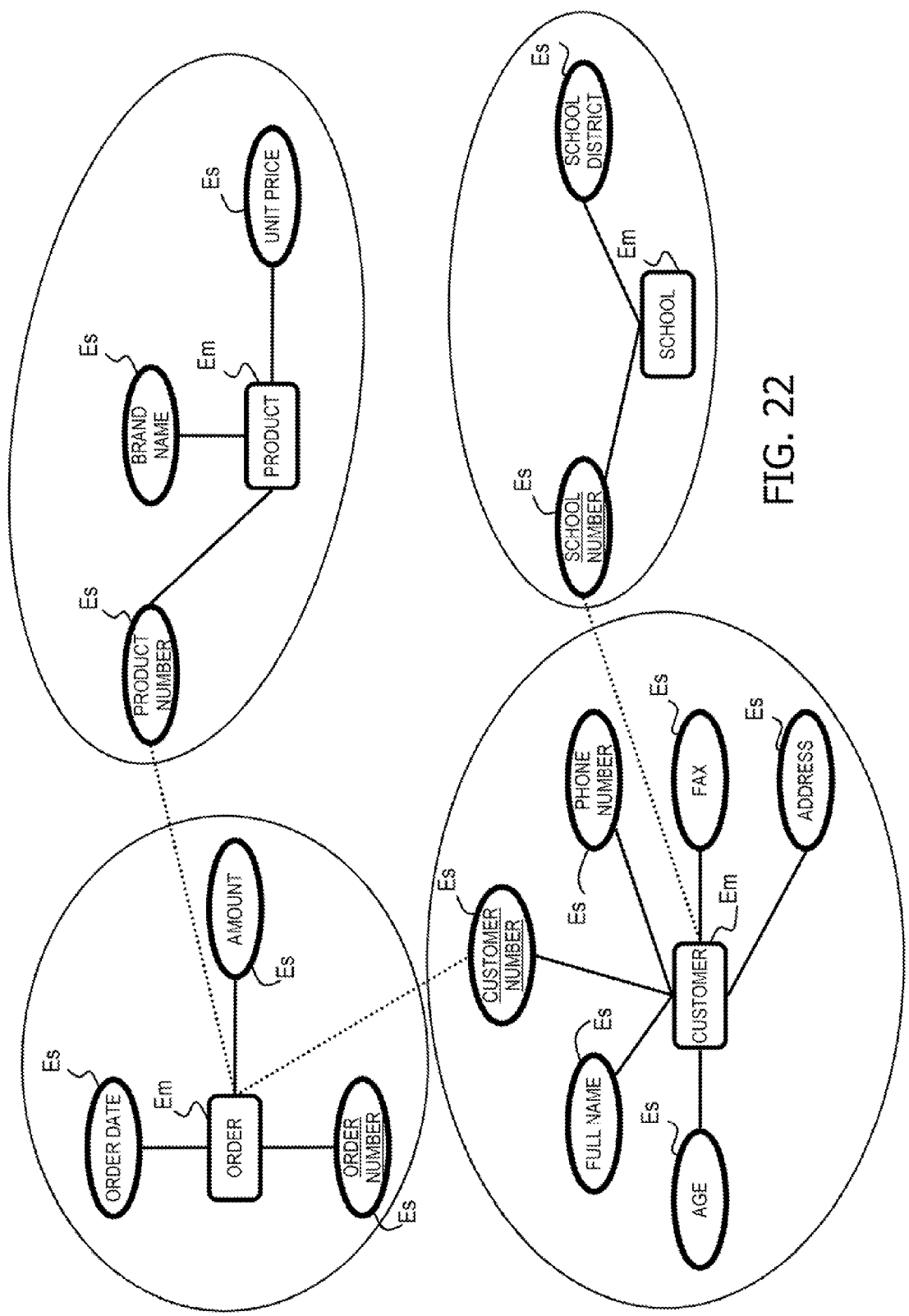
FIG. 22 is a diagram explaining the data system of the ToBe schema St2 where the reference relations between the entities are made up based on a relation map.

FIG. 22 is a diagram explaining the data system of the ToBe schema St2 where the reference relations between the entities are made up based on a relation map. In FIG. 22, the relation map has attribute names "product number", "customer number", "school number" Es which identify the data of the entity uniquely, in addition to the relation map depicted by FIG. 19. In addition, the dotted line in the relation map in FIG. 22 indicates the reference relations from other entities.

FIG. 23A and FIG. 23B are diagrams illustrating an example of the entity-attribute name relation lists T11, T12 of the data system of the AsIs schema Sa in which the attribute name circulates through between entities. FIG. 23A illustrates an example of entity-attribute name relation list T11 based on. AsIs schema Sa, and FIG. 23B illustrates the entity-attribute name relation list T12 which is deleted the entity.

Specially, the entity-attribute name relation list T11 in FIG. 23A has the entities "order", "product" and "customer". In addition, in the entity-attribute name relation list T11, the entity "order" has the attribute names "product number" and "customer number" in addition the an attribute name "order number". In addition, the entity "product" has the attribute name "order number" in addition to the attribute name "product number". In other words, the entities "order" and "product" have ID numbers mutually. Therefore, for example, when the attribute name "order number" of the entity "product", in which the entity "order" refers to in a certain order, indicates an order number of different order B, the attribute name circulates between entities.

According to the reconfiguration method of database in the present embodiment, at first when the entity-attribute name relation list generation unit 21 extracts an entity and an attribute name from the AsIs schema Sa. In addition, when there is a duplicate attribute name between a plurality of entities, the entity attribute name relation list generation unit 21 writes only one attribute name in the entity-attribute name relation list T12 depicted by FIG. 23 (step S11 in FIG. 9). Therefore, the entity-attribute name relation list T12 in FIG. 23 has the list of attribute names that there is not the overlap. In other words, the entity-attribute name relation list generation unit 21 deletes the entity from the entity-attribute name relation list T11, and excludes the overlap of the attribute name, even if the attribute name circulates between entities. Thereby, it is possible to obtain the list of the attribute name that there is not the overlap (the entity-attribute name relation list T12). And, according to the reconfiguration method of database in the present embodiment, it is possible to make up for the over and short of the entities based on the attribute names. Therefore, the reconfiguration method of database according to the present embodiment is applicable for the data system which the attribute name circulates through between the entities.

As described above, the reconfiguration method of database according to the present embodiment extracts a plurality of entity candidates based on a plurality of attribute names which are included in any of a plurality of databases and a first information about the relation degree between the attribute name and the entity, each of the plurality of databases including an entity having a correspondence relation with the plurality of attribute names. In addition, the reconfiguration method of database identifies a plurality of entity candidate groups, in which the entity candidate group is constructed by the plurality of entities extracted, and the entity in the group has correspondence relation with all attribute names by having the correspondence relation with either one attribute name by the entity and the number of the entity candidates is minimum, among the extracted the plurality of entity candidates. Then, the reconfiguration method identifies the entity candidate group, in which the total of the relation degree between the candidate entities in the entity candidate group is maximum, based on second information about the relation degree between the entities, among the identified plural entity candidate groups. And the database reconfiguration method assigns each of a plural attribute names to either one of the plurality of entity candidates in the entity candidate group, based on the first information, so as to have correspondence relation of the attribute name and entity candidate.

According to the reconfiguration method of database in the present embodiment, it is possible to select the combination of entities which have an independent concept without having a same attribute name, based on the information of the plural attribute names in the database, each other. In other words, according to the reconfiguration method of database in the present embodiment, it is possible to automate the reconfiguration of database by the semi-orthogonal based on the data system of the schema of the business system. Therefore, it is possible to reduce the man-hour in the operation and the maintenance of the business system and to rise up the quality.

In addition, according to the reconfiguration method of database in the present embodiment, because of being based on only the data system of the schema, it is possible to reconfigure the database without needing the true data (attribute value) in the database and the screen of the system and constitution information of document. In other words, even when the data or the screen are unable to use, it is possible to perform the automatic the semi-orthogonal based on the data system of the schema, and to maintain the secrecy about true data or the screen in the existing system. In addition, according to the reconfiguration method of database in the present embodiment, it is possible to reconfigure the database without affecting the existing true data by maintaining the list of attribute names.

In addition, the reconfiguration method of database in the present embodiment extracts entity candidates, which should be, based on present attribute name using each the relation degree between the attribute name and the entity candidates. Thereby, it is possible to supplement the over and short of the entity. In addition, the entity candidate group that the relation degree is maximum is selected. Therefore, it is possible to select the entity candidate group of which the degree to be used in same business is higher based on the assumption that the relation degree of the entity candidate group about one special business is high. Thereby, it is possible to improve the redundancy of the entity candidate group more appropriately.

In addition, according to the reconfiguration method of database in the present embodiment, it is evaded that the data system after the reconfiguration becomes enormous by selecting the entity candidate group having minimum number of entity candidates. In addition, it is assumed that the grand total of the similar degree between entity candidates becomes small so that there are few entity candidates, and that the entity candidates have a independent concept each other. Therefore, according to the reconfiguration method of database in the present embodiment, it is possible to select entity candidate group having an independent concept each other.

In addition, in the reconfiguration method of database according to the present embodiment, the specifications of data system which is the input do not have a limit. In other words, the reconfiguration method of database according to the present embodiment is effective for the data system extending over a plurality of database and is effective for the data system extending the plurality of systems having a plurality of database each.

Furthermore, the reconfiguration method of database according to the present embodiment, after extracting a plurality of entity candidates, generates correspondence information which indicate the correspondence relation between each of the plurality of entity candidates which are extracted and each of the plurality of attribute names and identifies a plurality of entity candidate group among a plurality of entity candidates, based on the correspondence information. Thereby, it is possible to identify the entity candidate group having the correspondence with all attributes names effectively.

In addition, the reconfiguration method of database according to the present embodiment, after identifying the entity candidate group, assigns each of the plurality of attribute names to the entity candidate, in which the relation degree based on the first information is greatest, among the entity candidate belonging to the entity candidate group. Therefore, by selecting the correspondence relation between the attribute name and the entity candidate, which has maximum relation degree, based on the assumption that the relation degree between the attribute name and the entity candidate is higher in one specific business, it is possible to select the correspondence relation which has a higher degree to be used in same business. Thereby, it is possible to select more appropriate correspondence relation.

In addition, according to the reconfiguration method of database in the present embodiment, the relation degree between the attribute name and the entity is acquired based on either or both of the co-occurrence frequency with the attribute name and the entity and the similar degree with the attribute name and the entity. Therefore, according to the reconfiguration method of database in the present embodiment, it is possible to acquire the relation degree based on objective information by acquiring the relation degree based on either or both of the co-occurrence frequency and the similar degree. In addition, by extracting an entity candidate having the relation degree of more than the predetermined value with the attribute name, it is possible to extract more appropriate entity candidate based on objective information than a case that the user presents the entity candidate. Furthermore, by selecting the correspondence relation in which the relation degree between the attribute name and the entity candidate is maximum, it is possible to select more appropriate correspondence relation between the attribute name and the entity candidate based on objective information.

In addition, according to the reconfiguration method of database in the present embodiment, the relation degree between the entities is acquired based on either or both of the co-occurrence frequency with the entity and another entity and the similar degree with the entity and another entity. Therefore, it is possible to acquire the relation degree between the entities based on objective information by acquiring the relation degree based on either or both of the co-occurrence frequency and the similar degree. Furthermore, by selecting the entity candidate group having maximum relation degree, it is possible to select more appropriate entity candidate group based on objective information.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method for reconfiguration of a database, the method comprising:
    reading a plurality of entities and a plurality of attribute names from at least one of a plurality of databases, the plurality of attribute names having a correspondence relation with the plurality of entities;
    generating an attribute name list including the plurality of attribute names having the correspondence relation with each of the plurality of entities;
    extracting a plurality of entity candidates based on first information about a relation degree for each of the plurality of attribute names corresponding to a single entity in the attribute name list, the relation degree indicating a degree of relationship between the respective attribute name and the single entity;
    first identifying a plurality of entity candidate groups in which each is comprised of the plurality of entity candidates extracted, each of the entity candidate groups having the correspondence relation with all the attribute names and the number of the entity candidates, which constitutes the entity candidate group, is minimum;
    second identifying a first entity candidate group from the plurality of entity candidate groups, the first entity candidate group having a maximum total number of relation degrees which indicates a degree of relationship between the plurality of entities in the entity candidate group, based on second information about the relation degree which indicates a degree of relationship between the plurality of entities; and
    assigning each of the plurality of attribute names to either one of the plurality of entity candidates in the entity candidate group so as to have the correspondence relation of the attribute name and the entity candidate based on the first information.

2. The method for reconfiguration of the database according to claim 1, wherein the first identifying further comprising:
    generating correspondence information which indicate the correspondence relation between each of the plurality of entity candidates which is extracted and each of the plurality of attribute names; and
    the first identifying the plurality of entity candidate groups based on the correspondence information.

3. The method for reconfiguration of the database according to claim 1, wherein the assigning comprising:
    assigning each of the plurality of attribute names to the entity candidate in which the relation degree of the first information is maximum, among the entity candidates belonging to the entity candidate group.

4. The method for reconfiguration of the database according to claim 1, wherein the extracting comprising:
    extracting the relation degree between the attribute name and the entity which is acquired, based on either one or both of a co-occurrence frequency with the attribute name and the entity and a similar degree with the attribute name and the entity.

5. The method for reconfiguration of the database according to claim 1, wherein the second identifying comprising:
    identifying the second information about the relation degree which is acquired, according to either one or both of a co-occurrence frequency with the entity and another entity and a similar degree with the entity and another entity.

6. A computer-readable non-transitory recording medium having stored therein a reconfiguration program that causes a computer to execute a process comprising:
    reading a plurality of entities and a plurality of attribute names from at least one of a plurality of databases, the plurality of attribute names having a correspondence relation with the plurality of entities;
    generating an attribute name list including the plurality of attribute names having the correspondence relation with each of the plurality of entities;
    extracting a plurality of entity candidates based on first information about a relation degree for each of the plurality of attribute names corresponding to a single entity in the attribute name list, the relation degree indicating a degree of relationship between the respective attribute name and the single entity;
    first identifying a plurality of entity candidate groups in which each is comprised of the plurality of entity candidates extracted, each of the entity candidate groups having the correspondence relation with all the attribute names and the number of the entity candidates, which constitutes the entity candidate group, is minimum;
    second identifying a first entity candidate group from the plurality of entity candidate groups, the first entity candidate group having a maximum total number of relation degrees which indicates a degree of relationship between the plurality of entities in the entity candidate group, based on second information about the relation degree which indicates a degree of relationship between the plurality of entities; and
    assigning each of the plurality of attribute names to either one of the plurality of entity candidates in the entity candidate group so as to have the correspondence relation of the attribute name and the entity candidate based on the first information.

7. The computer-readable non-transitory recording medium according to claim 6, wherein the first identifying further comprising:
    generating correspondence information which indicate the correspondence relation between each of the plurality of entity candidates which is extracted and each of the plurality of attribute names; and the first identifying the plurality of entity candidate groups based on the correspondence information.

8. The computer-readable non-transitory recording medium according to claim 6, wherein the assigning comprising:

assigning each of the plurality of attribute names to the entity candidate in which the relation degree of the first information is maximum, among the entity candidates belonging to the entity candidate group.

9. The computer-readable non-transitory recording medium according to claim 6, wherein the extracting comprising:

extracting the relation degree between the attribute name and the entity which is acquired, based on either one or both of a co-occurrence frequency with the attribute name and the entity and a similar degree with the attribute name and the entity.

10. The computer-readable non-transitory recording medium according to claim 6, wherein the second identifying comprising:

identifying the second information about the relation degree which is acquired, according to either one or both of a co-occurrence frequency with the entity and another entity and a similar degree with the entity and another entity.

11. A reconfiguration device of a database, the device comprising:

a storing unit which stores first information about a relation degree indicating a degree of relationship between an attribute name and an entity and second information about a relation degree indicating a degree of relationship between a plurality of entities; and a processing unit configured to read the plurality of entities and a plurality of attribute names from at least one of a plurality of databases, the plurality of entities having a correspondence relation with the plurality of entities, generate an attribute name list including the plurality of attribute names having the correspondence relation with each of the plurality of entities, extract a plurality of entity candidates based on the first information for each of the plurality of attribute names corresponding to a single entity in the attribute name list, the relation degree indicating a degree of relationship between the respective attribute name and the single entity, identify a plurality of entity candidate groups in which each is comprised of the plurality of entity candidates extracted, each of the entity candidate groups having the correspondence relation with all the attribute names and the number of the entity candidates, which constitutes the entity candidate group, is minimum, identify a first entity candidate group from the plurality of entity candidate groups, the first entity candidate group having a maximum total number of relation degrees which indicates a degree of relationship between the plurality of entities in the entity candidate group, based on the second information about the relation degree which indicates a degree of relationship between the plurality of entities and assign each of the plurality of attribute names to either one of the plurality of entity candidates in the entity candidate group so as to have the correspondence relation of the attribute name and the entity candidate based on the first information.

12. The reconfiguration device according to claim 11, wherein the processing unit is configured to generate correspondence information which indicate the correspondence relation between each of the plurality of entity candidates which is extracted and each of the plurality of attribute names, and identify the plurality of entity candidate groups based on the correspondence information.

13. The reconfiguration device according to claim 11, wherein the processing unit is configured to assign each of the plurality of attribute names to the entity candidate in which the relation degree of the first information is maximum, among the entity candidates belonging to the entity candidate group.

14. The reconfiguration device according to claim 11, wherein the processing unit is configured to extract the relation degree between the attribute name and the entity which is acquired based on either one or both of a co-occurrence frequency with the attribute name and the entity and a similar degree with the attribute name and the entity.

15. The reconfiguration device according to claim 11, wherein the processing unit is configured to identify the second information about the relation degree which is acquired based on either one or both of a co-occurrence frequency with the entity and another entity and a similar degree with the entity and another entity.

* * * * *